United States Patent
Shankara

(10) Patent No.: US 7,673,041 B2
(45) Date of Patent: Mar. 2, 2010

(54) METHOD TO PERFORM EXACT STRING MATCH IN THE DATA PLANE OF A NETWORK PROCESSOR

(75) Inventor: Udaya Shankara, Marathahalli (IN)

(73) Assignee: Intel Corporation, Santa Clara, CA (US)

( * ) Notice: Subject to any disclaimer, the term of this patent is extended or adjusted under 35 U.S.C. 154(b) by 1154 days.

(21) Appl. No.: 11/264,324

(22) Filed: Nov. 1, 2005

(65) Prior Publication Data

US 2007/0115986 A1 May 24, 2007

(51) Int. Cl.
G06F 15/173 (2006.01)
(52) U.S. Cl. ...................................... 709/224
(58) Field of Classification Search ................. 709/224, 709/238
See application file for complete search history.

(56) References Cited

U.S. PATENT DOCUMENTS 7,051,078 B1 * 5/2006 Cheriton ..................... 709/214

2003/0188089 A1 * 10/2003 Perloff ........................ 711/108

OTHER PUBLICATIONS

Dharmapurikar, S. et al., Deep Packet Inspection Using Parallel Bloom Filters, Computer Science and Engineering Department, pp. 1-8.

* cited by examiner

*Primary Examiner*—Jeffrey Pwu
*Assistant Examiner*—Scott M Sciacca
(74) *Attorney, Agent, or Firm*—Blakely, Sokoloff, Taylor & Zafman LLP

(57) ABSTRACT

Methods for performing exact search string matches in the data plane of a network processor. The methods employ a two-stage string search mechanism to identify the existence of a search string from a set S in a packet payload. A first pre-processing stage identifies a potential search string match and a second analysis stage determines whether the first stage match corresponds to an exact string match. The first stage is implemented using hash values derived from at least one of search strings in set S or sub-strings of those search strings. In one embodiment, a plurality of Bloom filters are used to perform the first pre-processing stage, while in other embodiments various CAM-based technique are used. Various TCAM-based schemes are disclosed for performing the second analysis stage. The methods enable packet payloads to be searched for search strings at line-rate speeds.

7 Claims, 23 Drawing Sheets

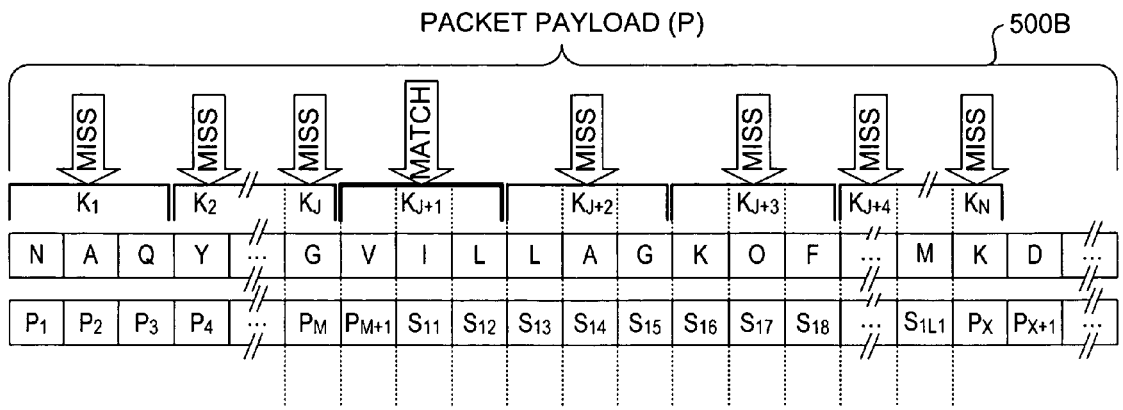
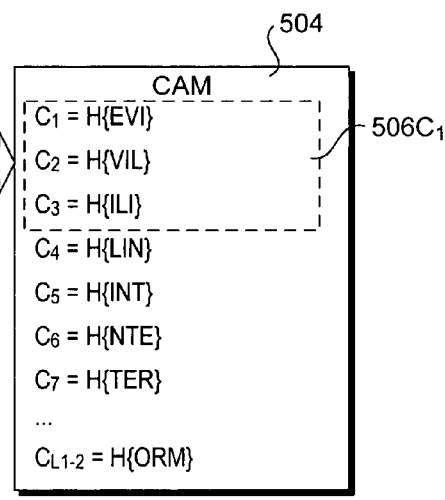
*Fig. 5c*

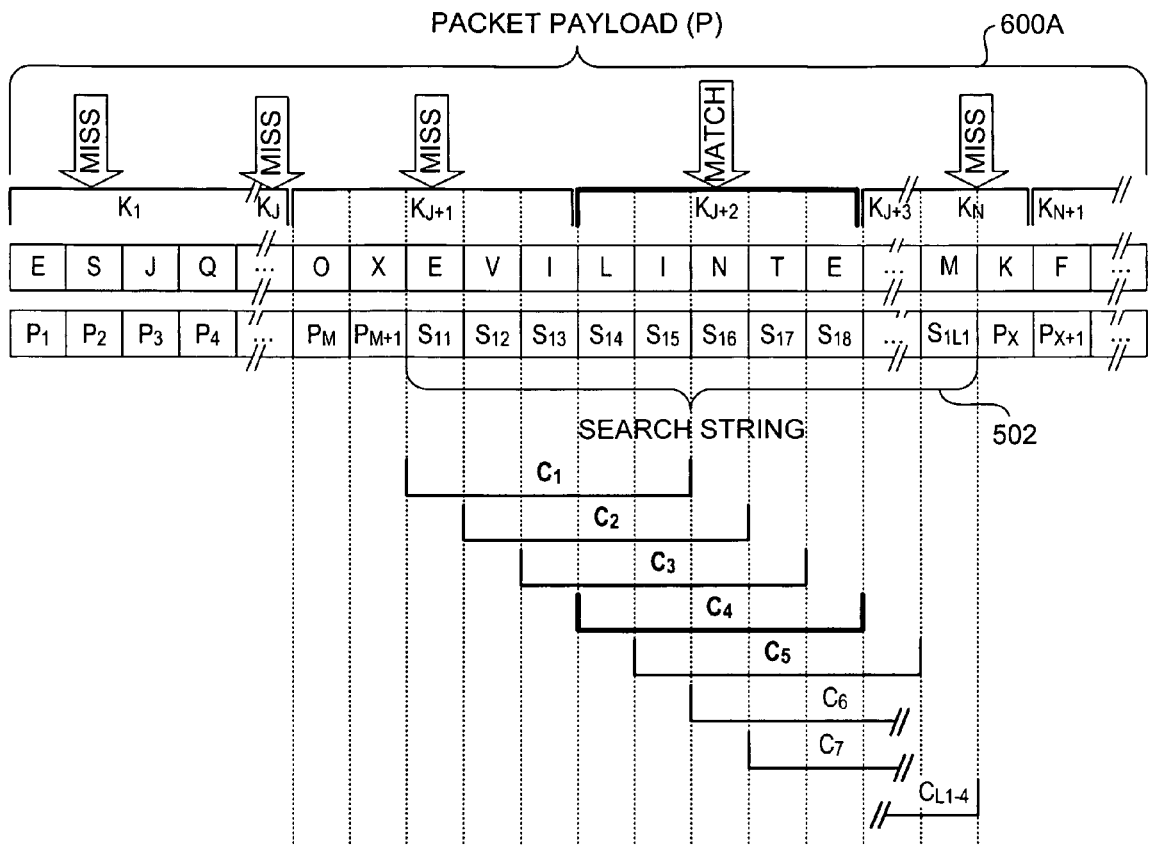
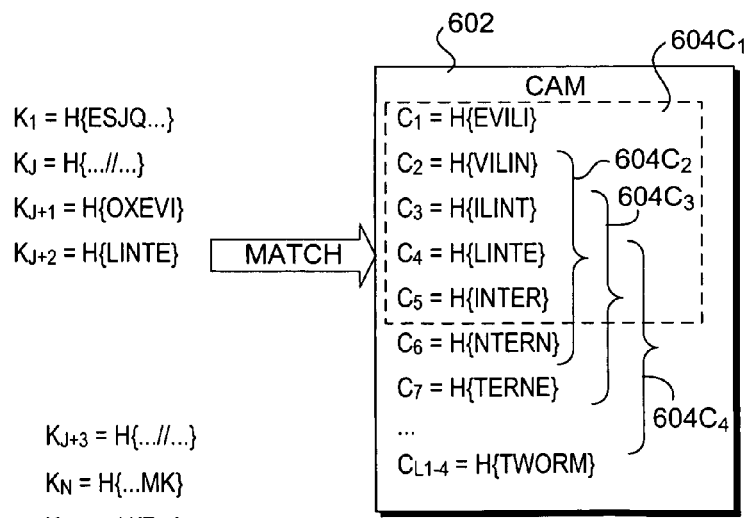
*Fig. 6b*

(a) In this extreme case, the KEY that identifies the occurrence of the string is at the beginning of the string (b) In this extreme case, the KEY that identifies the occurrence of the string is at the end of the string (c) Combining (a) and (b) above it can be concluded that when there is a hit for a string, a substring of length $2*L_{LONGEST} - L_{KEY}$ must be analysed.

Fig. 10

STAGE 1

$L_{KEY}$

InternetsecurityisanimportantissueInternetwormscandamagemillionsofcomputersandca
ncauselossofdataworthbillionsofdollars Stage 1 (Pre-processing): Returns a hit for key "wor". When the hit is detected, a substring of length 59 is chosen for analysis by Stage 2.

⇒ Hit $2*L_{LONGEST} - L_{KEY} = 59$ tyisanimportantissue|Internetworm|scandamagemillionsofcompute $L_{LONGEST}$ This substring gives a TCAM hit for "Internetworm"

$L_{LONGEST}$

⇒ Match

```
  :
  Communicationgroup***************
  IntegratedElectronics************
  Internetworm*********************
  NetworkProcessorbusinessofIntel**
  :
```
TCAM ~1000

STAGE 2

Stage 2 (Analysis):
$L_{LONGEST}$ bytes are analyzed at a time. The window of $L_{LONGEST}$ bytes slides over the substring $L_{LONGEST} - L_{KEY} + 1$ times.

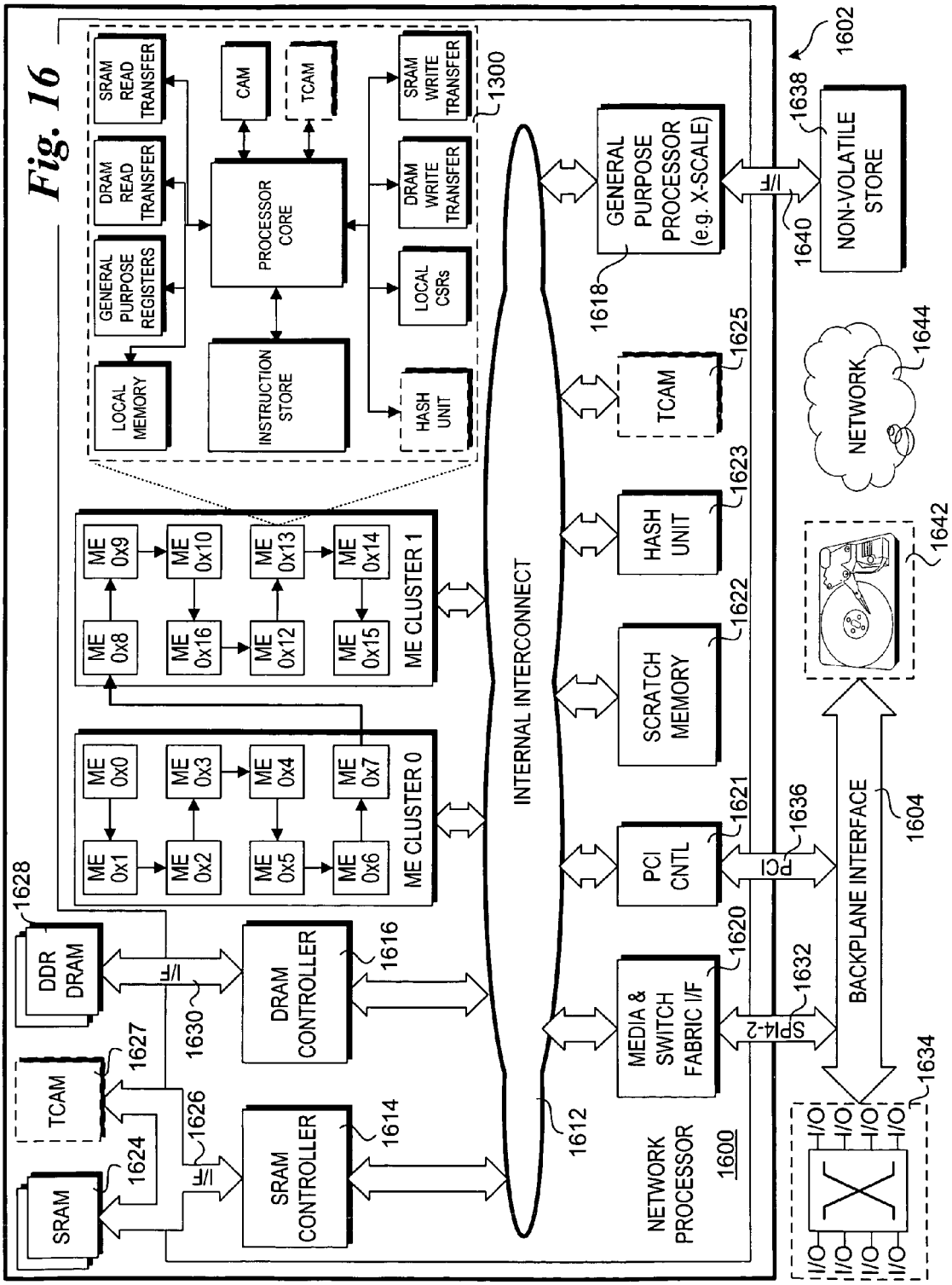

METHOD TO PERFORM EXACT STRING MATCH IN THE DATA PLANE OF A NETWORK PROCESSOR

CROSS-REFERENCE TO RELATED APPLICATIONS

This application contains subject matter related to U.S. Ser. No. 11/018,942, entitled EFFICIENT CAM-BASED TECHNIQUES TO PERFORM STRING SEARCHES IN PACKET PAYLOADS, filed Dec. 21, 2004.

1. Field of the Invention

The field of invention relates generally to computer and communication networks and, more specifically but not exclusively relates to techniques for performing string searches in packet payloads.

2. Background Information

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Modem network processors perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various packet-processing compute engines of a network processor, as well as other optional processing elements, will function as embedded specific-purpose processors. In contrast to conventional general-purpose processors, the compute engines do not employ an operating system to host applications, but rather directly execute "application" code using a reduced instruction set. For example, the microengines in Intel's IXP2xxx family of network processors are 32-bit RISC processing cores that employ an instruction set including conventional RISC (reduced instruction set computer) instructions with additional features specifically tailored for network processing. Because microengines are not general-purpose processors, many tradeoffs are made to minimize their size and power consumption.

In addition to the foregoing packet forwarding operations, there may be a need to search packet payloads for a given string or set of strings. For example, security applications may need to search for certain strings indicative of a virus or Internet worm that is present in the packet. Other applications may likewise need to peek into the packet payload, such as for load balancing or billing purposes.

Searching packet payloads presents a problem with respect to line-rate packet forwarding. The reason for this is that string searches may be very time consuming, especially if the strings are relatively long. In contrast, packet forwarding typically has a pre-defined overall latency built into the sequence of operations required to forward a packet. The overall latency is the sum of individual latencies corresponding to packet processing operations that are well-defined.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5c is a schematic diagram illustrating an example of the search string verification process of FIG. 4a, wherein $L_{KEY}=3$ and a search is performed on the search "EVILINTERNETWORM" search stream, and wherein a false hit on a packet payload including a string comprising "VILLAGEOFTHEDAMNED" is detected;

FIG. 6a is a schematic diagram illustrating an example of the search string verification process of FIG. 4a, wherein $L_{KEY}=5$ and a search is performed on the generic search string of FIG. 5a;

FIG. 6b is a schematic diagram illustrating an example of the search string verification process of FIG. 4a, wherein $L_{KEY}=5$ and a search is performed on the "EVILINTERNETWORM" search string of FIG. 5b;

FIG. 7b is a schematic diagram illustrating the packet payload search process of FIG. 4b being performed on the generic search string of FIG. 7a;

FIG. 10 illustrated identification of the existence of a matching search string using one embodiment of the two-stage search process;

FIG. 16 is a schematic diagram of a network line card employing a network processor that employs microengines used to execute threads to perform packet payload string search operations in accordance with the embodiments disclosed herein.

DETAILED DESCRIPTION

Figure 1:
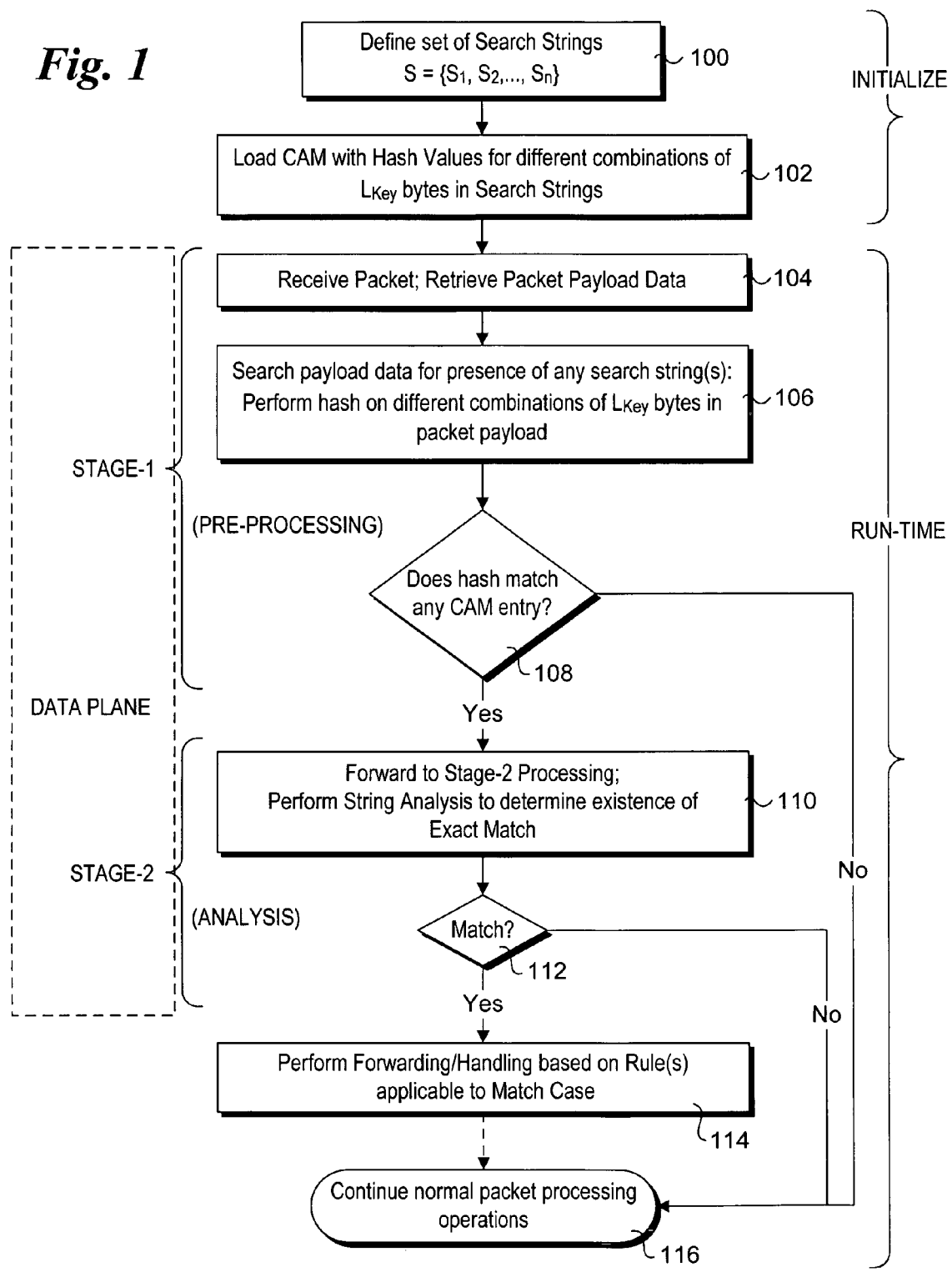
FIG. 1 is a flowchart illustrating operations and logic employed to determine if one or more search strings are present in packet payload data using a two-stage search process, according to one embodiment of the invention.

Embodiments of methods and apparatus for performing efficient packet payload string searches in a network processor data plane are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, efficient string search techniques for packet payloads are disclosed that support line-rate packet forwarding speeds. The embodiments employ a two-stage string search mechanism, wherein a first stage identifies a potential search string match and the second stage determines whether the first stage match corresponds to an exact string match.

Some embodiments of the first stage employ CAM (Content Addressable Memory)-based comparison schemes, wherein selected sub-string portions of one or more search strings are hashed, with the resulting hash values being stored as entries in a CAM. During packet payload searching, sub-string portions of the payload are hashed to form keys, with the result of each hash compared against CAM entries. If there is a CAM "hit" (e.g., a current hash result matches one of the CAM entries), there is a possibility that the entire search string is present in the payload. Accordingly, additional processing is performed by the second stage to verify whether an exact match exists. Meanwhile, the absence of a CAM hit indicates none of the search strings are present in the payload.

Under a typical implementation, a set of one or more (N) strings will be searched for in packet payloads in connection with some packet forwarding operations. The set of all search strings is represented as $S=\{S_1, S_2, \ldots, SN\}$. Let $L_1, L_2, \ldots, L_N$ represent the respective lengths of strings $S_1, S_2, \ldots, S_N$. Furthermore, note that the given set of strings may have different lengths and a given string may be located at any offset within a packet payload being searched.

Under a conventional string search approach, a sequence of bytes in the data object being searched (e.g., a packet payload in the examples discussed below) are compared with a predefined sequence of bytes representing the search string. This process, while accurate, may be very time consuming, especially when longer strings are being searched for. Furthermore, the techniques may require significant amounts of scratch memory (e.g., memory used for temporary usage during the string comparison operations).

In accordance with one aspect of the embodiments disclosed herein, a hashing scheme is employed to provide efficient string searches. Through hashing, a long sequence of bytes can be converted to a smaller value, which is much easier to compare to a pre-stored hash result derived from a corresponding hash key. Furthermore, the embodiments employ a CAM-based comparison scheme, wherein hash results derived from search strings of interest are stored in a CAM. Rather then performing a byte-by-byte comparison, the CAM-based scheme enables a given input hash result to be compared with all of the hash value entries stored in the CAM in parallel. The combination of employing hashing techniques and CAM-based data comparisons results in a very efficient string search mechanism that supports line-rate speeds.

A flowchart illustrating an overall string search and handling process in accordance with one embodiment is shown in FIG. 1. The first two operations in blocks 100 and 102 represent initialization operations, which are performed prior to the subsequent run-time operations depicted in FIG. 1. First, in block 100, the set of search strings S is defined. For example, if an Internet worm or virus is to be searched for, S may include a binary sub-string corresponding to a selected portion of the executable file for a known worm or virus. In general, the set S will include one or more search strings.

Next, in block 102, hash values are derived from the search strings and loaded into a CAM. In further detail, for each string in S, different sub-string combinations of $L_{key}$ bytes for each search string are hashed, where $L_{key}$ represents the length of the hash keys. The resulting hash values are then stored in the CAM. Generally, the hash values may be loaded into the CAM during initialization of a network processor, or may be loaded into the CAM during ongoing network processor operations (i.e., at run-time).

The remaining run-time operations depicted in FIG. 1 are performed on a continuous basis in response to receipt of new packets at a network device or the like. Furthermore, the run-time operations include a pre-processing stage (alternately referred to as stage 1) and an exact match (analysis) stage (alternately referred to as stage 2). The run-time process begins with receipt of a packet in a block 104. In response, normal packet processing operations are performed, such as extracting the metadata (e.g., packet header data) and storing the packet payload data in memory. All or a portion of the packet payload data is then retrieved into local memory for local access by a compute engine.

The stage-1 operations begin in a block 106, wherein the packet payload data is searched for the presence of any search string in S. During this first operation, hash keys comprising different sequential combinations of $L_{key}$ bytes (e.g., substrings) are taken from the payload data, and a corresponding hash result is calculated by performing a hash on each hash key. For each hash key, the result is then simultaneously compared with all entries in the CAM. The determination of whether there is a match between the hash results for a packet payload and any of the CAM entries is depicted by a decision block 108. A NO (FALSE) determination by block 108 results if there is not a match (no CAM hit). This further indicates the absence of any string of S in the payload. Accordingly, the process is advanced to a continuation block 116, wherein normal packet processing operations are continued.

If there is a hit, there is a possibility of one of the strings from set S occurring in the payload. Once a hit is identified, the process is forwarded to perform stage-2 search operations, as depicted for simplicity by a single block 110. As described in further detail below, stage-2 processing is used to verify whether the hit was a false hit or any of the strings from set S are present in the payload (a true hit). This analysis phase is needed for several reasons. First, the hash values stored in the CAM are derived from sub-string combinations of $L_{key}$ bytes and not an entire search string. Thus, a CAM hit only indicates that a matching portion of the search string might exist in the payload. Second, matching hash values do not necessarily imply matching strings (sub-strings in this instance). Although hashing is a good way to identify string matches, it isn't perfect. It is possible for dissimilar hash keys (e.g., the sub-strings being compared) to produce the same hash result.

As depicted by a decision block 112, during the phase-2 analysis, a determination is made to whether a matching search string is found in the payload data. If there is no match, processing of the packet is continued in the normal manner, as depicted by continuation block 116. If there is a match, forwarding and/or handling of the packet is performed in a block 114 based on the applicable rule(s) for the match case. For example, if the string relates to a virus or worm, the corresponding packet handling rule may drop the packet and send information to instruct the network device (as well as other network devices, potentially) to drop packets containing similar packet metadata. Other information could be provided to not resend the packet or to otherwise block packets from being sent from the same source address. Similarly, if the search string is used for billing purposes, the operations performed in block 114 may relate to a billing process.

In one embodiment, all of the Stage-1 and Stage-2 processing is performed in the NPU dataplane (also referred to as the "fast" path), while the operations of block 114 may be performed using the dataplane or control plane (also referred to as the "slow" path), depending on the complexity of the operations. In further detail, modern network processors are able to support high line-rates by providing two levels of packet processing: fast path and slow path. Fast path processing is performed at line-rate speeds, and is used to handle processing of most packets. In some architectures, fast path operations are performed in the "data plane," while "slow" path operations are performed in the "control plane." Slow path processing is generally used for exception handling and other considerations, such as for packets that are destined for the network device hosting the network process (and thus do not need to be forwarded). Whether a packet is handled via the fast or slow path is usually determined by the network processor and/or other components in the network device. For example, if the network processor determines handling of a packet will exceed the Maximum Transmission Unit (MTU) of a particular process, that packet is assigned to the slow path.

Figure 2A:
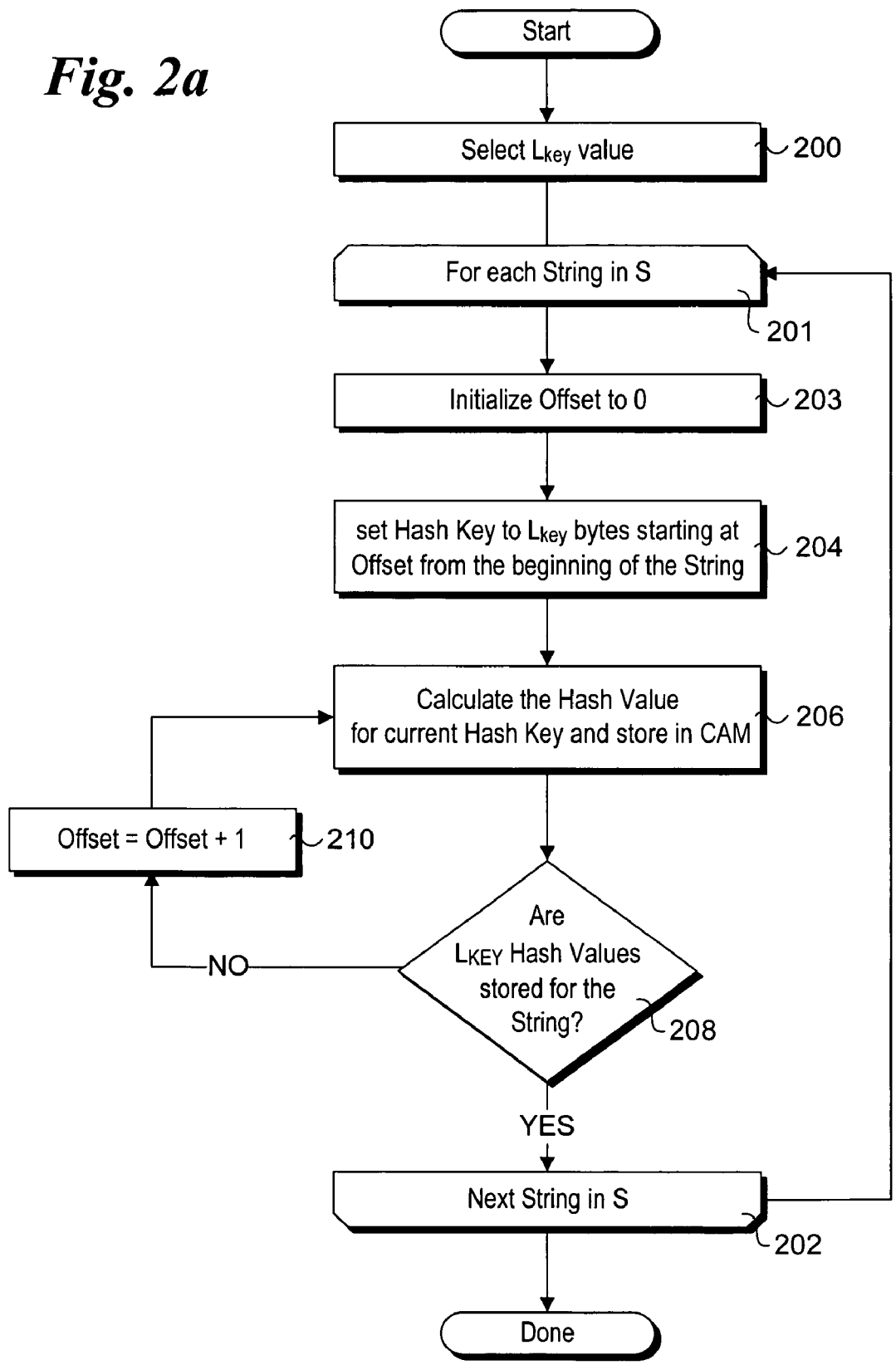
FIG. 2a is a flowchart illustrating operations and logic used to generate hash values from overlapping sub-strings in the search strings, wherein each sub-string has a length of $L_{KEY}$ and there are $L_{KEY}$ hash values stored for each search string.
Figure 2B:
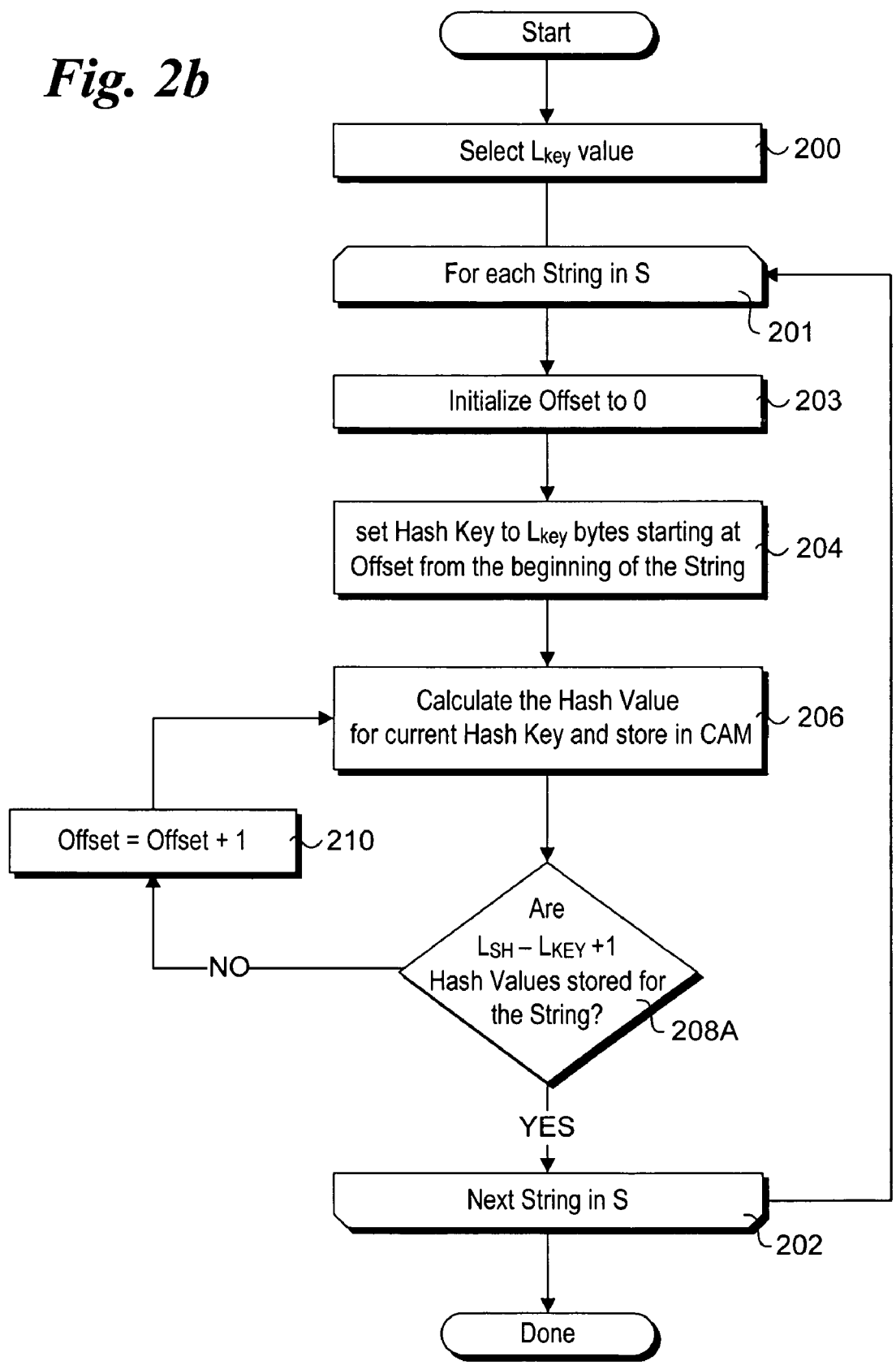
FIG. 2b is a flowchart illustrating operations and logic used to generate hash values from overlapping sub-strings in the search strings, wherein each sub-string has a length of $L_{KEY}$ and the number of sub-strings used to generate the hash values for each search string correspond to the number of sub-strings required to span the shortest search string.
Figure 3A:
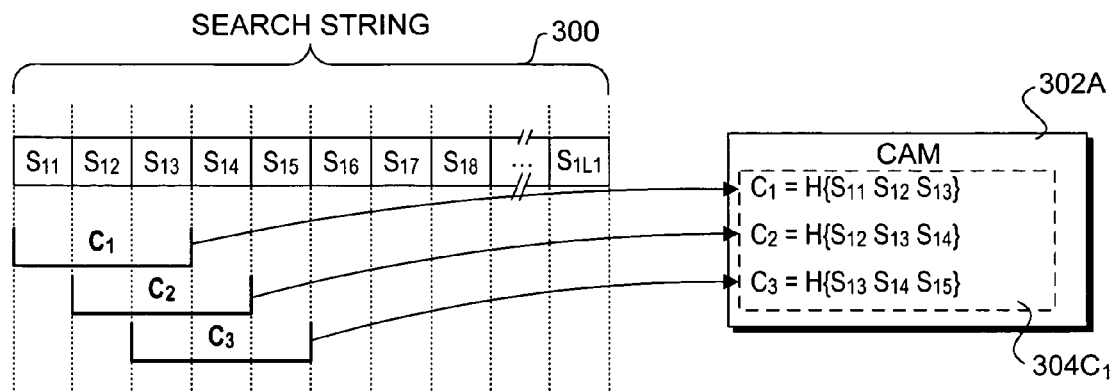
FIG. 3a is a schematic diagram illustrating a first exemplary set of hash values generated by performing the process of FIG. 2a, wherein $L_{KEY}=3$.
Figure 3B:
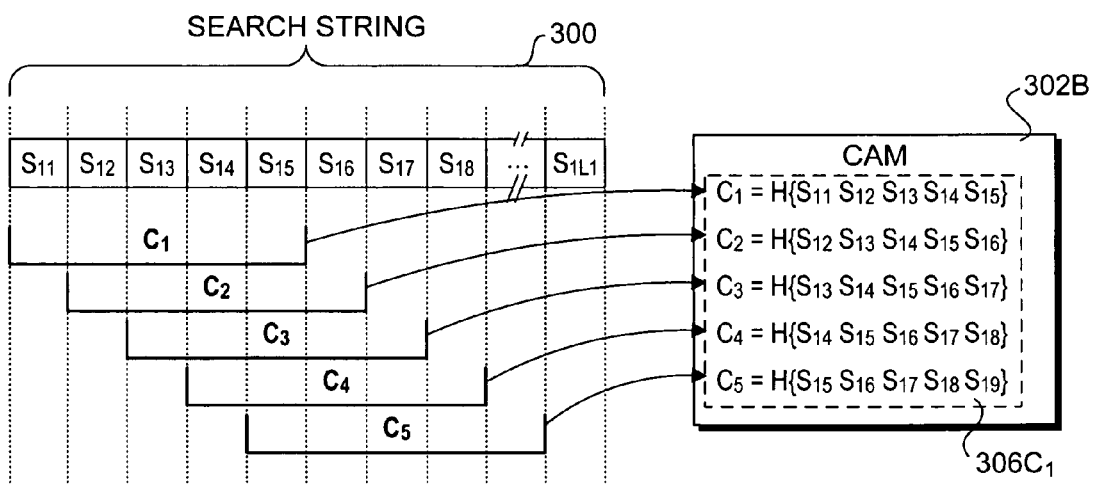
FIG. 3b is a schematic diagram illustrating a first exemplary set of hash values generated by performing the process of FIG. 2a, wherein $L_{KEY}=5$.

Details of one embodiment of the initialization operation of blocks 100 and 102 are shown in FIGS. 2, 3a, and 3b. As discussed above, the first operation is to identify the strings to be searched. For illustrative purposes, the strings in set $S=\{S_1, S_2, \ldots, S_N\}$ are represented in the figures herein as follows:

$S_1 = s_{11} \, s_{12} \, s_{13} \ldots s_{1L1}.$
$S_2 = s_{21} \, s_{22} \, s_{23} \ldots s_{2L2}.$
$S_N = s_{N1} \, s_{N2} \, s_{N3} \ldots s_{NLN}.$ Under this nomenclature, the first subscript value identifies the string, while the second subscript value identifies the position of a byte within the string. The subscript values for the last entry in each string identify the length of that string. For example, the subscript "1L1" indicates the length of string 1 is L1 bytes.

After the set of search strings is defined, selected sub-string combinations of sequential bytes in the search strings are hashed and stored in the CAM. An exemplary generic search string 300 is shown in FIGS. 3a-d. In one embodiment, the selected combinations comprise $L_{key}$ bytes having starting points (i.e., first bytes) that are offset by one byte each (and thus have overlaps of $L_{key}-1$ bytes). In the embodiments illustrated in FIGS. 3a and 3b, the $L_{key}$ byte sub-string combinations begin at the start of search string 300, and are generated in accordance with the flowchart of FIG. 2.

The process begins in a block 200, wherein an $L_{key}$ value representing the length in bytes of the hash keys for which hashing is performed is selected. In general, the length of the hash keys will be somewhat related to the length of the search string. However, other considerations may also influence the selected $L_{key}$ value. The operations defined by start and end loop blocks 201 and 202 are then performed for each search string in S, as follows.

The first operation for a given string is to initialize an offset value (the offset from the start of the search string) to zero, as shown in a block 203. Next, in a block 204, the length of the current hash key is set to $L_{key}$ bytes, beginning from the start of the string (e.g., offset=0).

The operations in block 206, decision block 208, and block 210 are performed in a loop to generate $L_{key}$ CAM entries. First, in block 206, a hash value is calculated for the current hash key. For example, in FIG. 3a $L_{key}$ is 3, and the values of bytes $s_{11}$, $s_{12}$, and $s_{13}$ are hashed to produce a CAM entry $C_1$. The particular hash function that is employed is left to the designer. It may be a very simple hash, such as a mod(ulus) function, or a more sophisticated hash function, such as that employed by one of many well-know hash algorithms (e.g., MD4, MD5, the SHA-1 (secure hash algorithm-1) hash algorithm, etc.)

In one embodiment, $L_{key}$ entries derived from hash keys having starting points offset by one byte are stored in the CAM. As illustrated in the figures discussed below, $L_{key}$ entries derived from offset and overlapping sub-strings having a length of $L_{key}$ is the minimum number of entries needed to guarantee a CAM hit for a matching string. Accordingly, a determination is made in decision block 208 to whether there have been $L_{key}$ entries generated for the current string. If not, the process proceeds to block 210, wherein the offset is incremented by one. The process then loops back to block 206 to generate the next hash key value, with the operations of blocks 206 and 210 being repeated until $L_{key}$ CAM entries are generated.

FIG. 3a shows a CAM 302A including three CAM entries $C_{1-3}$. As depicted by the dashed box $304C_1$, the minimum number of CAM entries is equal to $L_{key}$, which is 3 in this instance. Thus, the operations of the flowchart of FIG. 2a will generate three CAM entries $C_1$, $C_2$, and $C_3$. Meanwhile, in the embodiment illustrated in FIG. 3b, $L_{key}$=5. Thus, the FIG. 2 operations will generate five hash results to be stored as entries $C_{1-5}$ in a CAM 302B, as depicted by a dashed box $306C_1$.

Figure 3C:
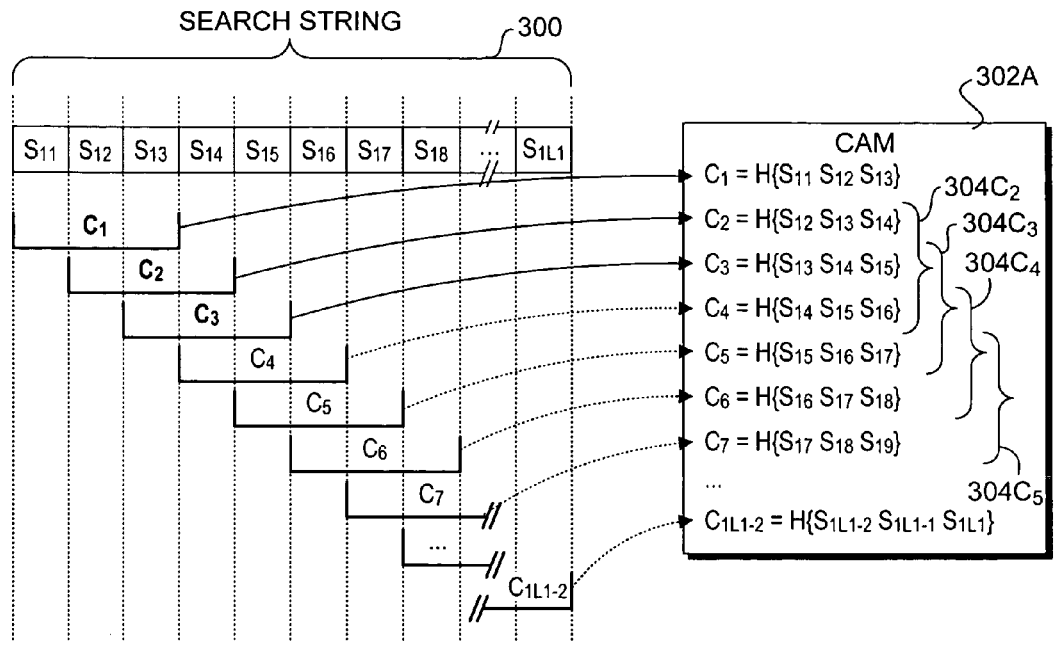
FIG. 3c is a schematic diagram illustrating a full set of hash values generated by performing the process of FIG. 2b, wherein $L_{KEY}=3$.
Figure 3D:
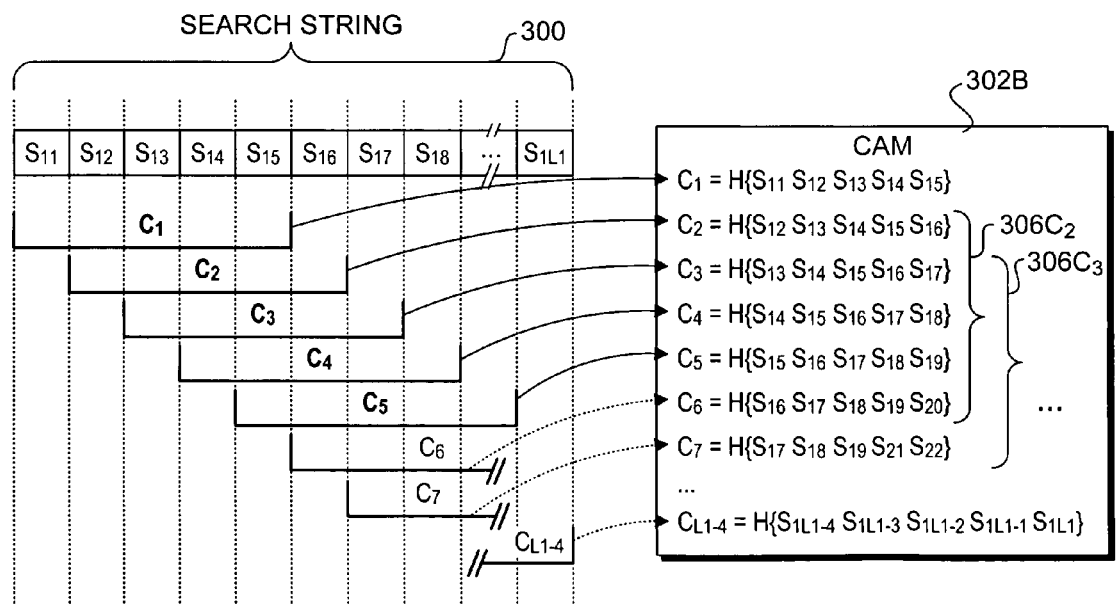
FIG. 3d is a schematic diagram illustrating a full set of hash values generated by performing the process of FIG. 2b, wherein $L_{KEY}=5$.

In addition to the minimum number of entries contained in dashed boxes $304C_1$, and $306C_1$, each of CAMs 302A and 302B show further entries in FIGS. 3c and 3d. These are depicted to show optional combinations of entries that may be stored in the CAM. For example, while the first $L_{key}$ entries beginning with the start of a search string are produced using the operations of FIG. 2, this is not meant to be limiting. The $L_{key}$ entries can begin at an offset anywhere within the search string, as long as the $L_{key}$ bytes of the last entry fall within the search string, as exemplified by CAM entry sets $304C_{2-5}$ in FIG. 3c and CAM entry sets $306C_{2-3}$ in FIG. 3d. There may be situations under which it is advantageous to not begin at the start of the search string. For example, if the search string comprises an ASCII string of characters, and any combination of $L_{key}$ sequential characters near the start of the string represent a common word, it may be advantageous to begin at an offset other than zero so that a hash key used to produce a CAM entry does not correspond to a common word.

The maximum length of $L_{key}$ is dependent on the length of the shortest string in S ($L_{SHORTEST}$), as defined to by:

$$L_{SHORTEST} \geq 2L_{KEY} - 1 \quad (1).$$

In order to guarantee that a search string present in a packet payload will be found, the condition of Equation 1 must be met.

The CAM entries in CAMs 302A and 302B are illustrative of CAM entries that might be generated for a given string. As discussed above, similar sets of CAM entries would be generated for each string in S. For clarity, these additional sets of CAM entries are not depicted herein so as to not obscure the operation of the searching phase, which is now discussed.

Figure 4A:
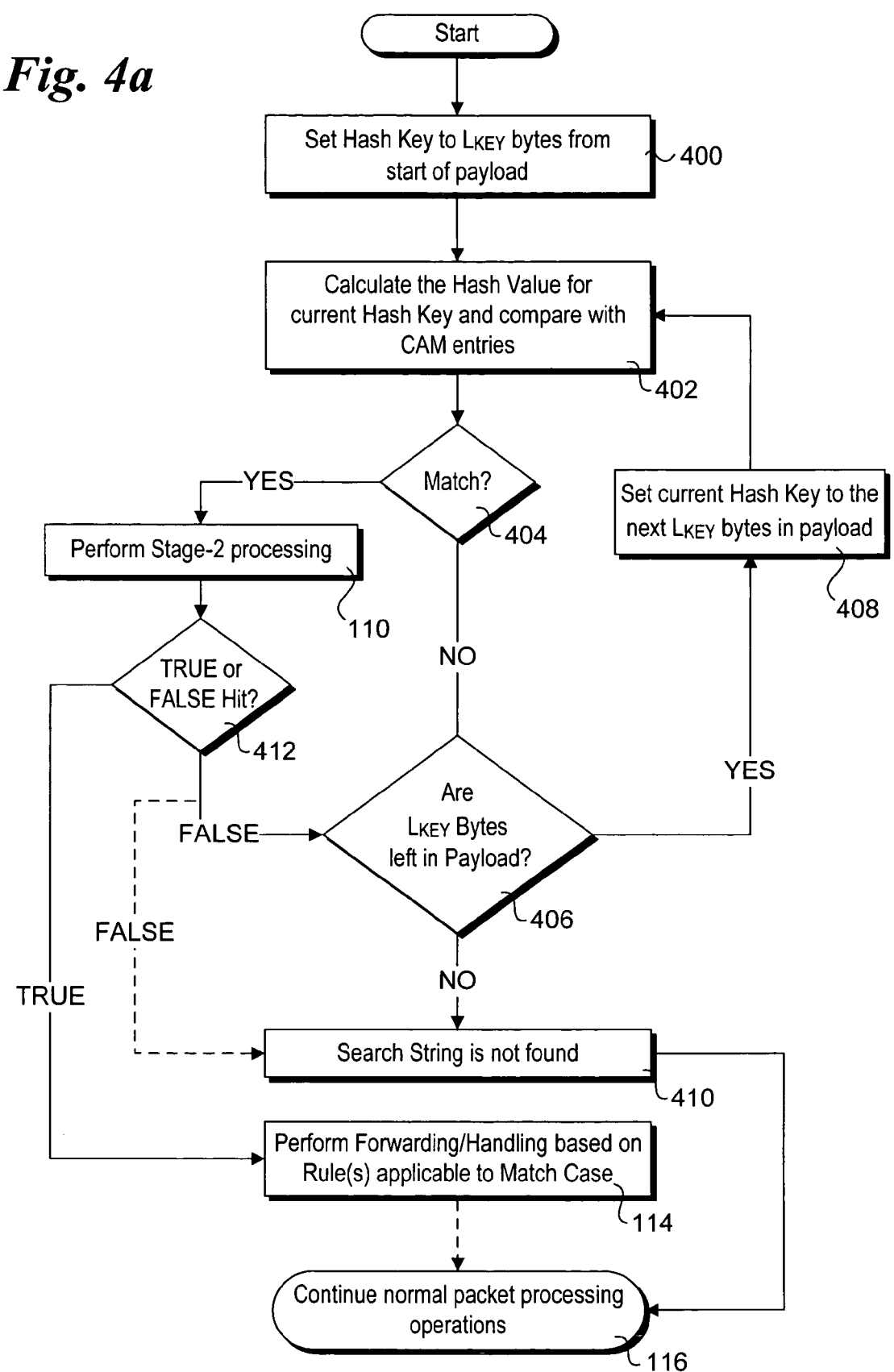
FIG. 4a is a flowchart illustrating operation and logic performed during one embodiment of run-time processing to verify the presence of a search string in a packet payload, wherein hash results derived from adjacent non-overlapping sub-strings in the payload are compared with hash values in the CAM.
Figure 5A:
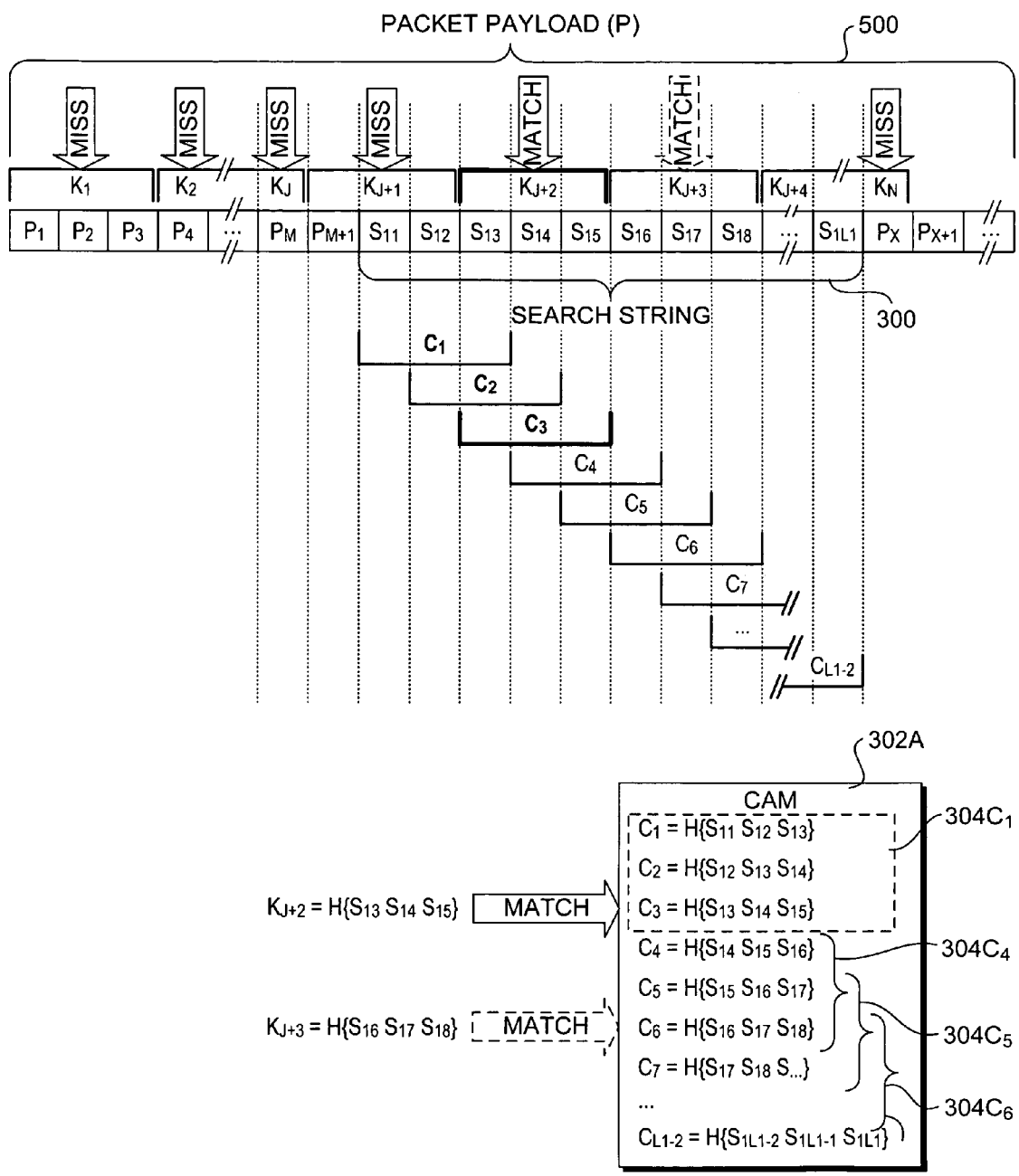
FIG. 5a is a schematic diagram illustrating an example of the search string verification process of FIG. 4a, wherein $L_{KEY}=3$ and a search is performed on a generic search string.
Figure 6A:
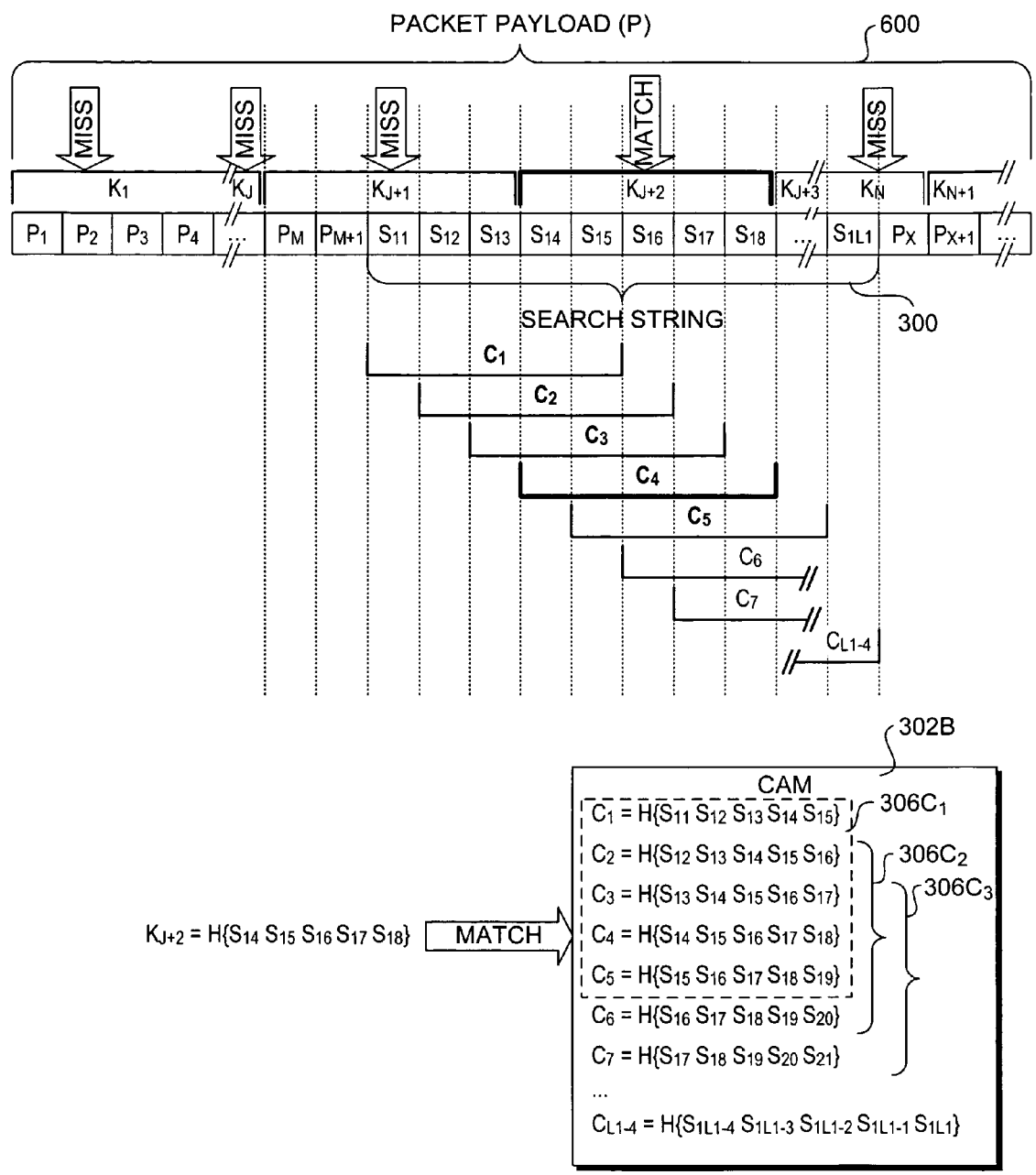

With reference to the flowchart of FIG. 4a and FIGS. 5a and 6a, the search process, according to one embodiment, proceeds in the following manner. In a block 400, a hash result calculated from a hash key comprising the first $L_{key}$ bytes in the payload is generated. For example, similar packet payloads 500 and 600 are shown in FIGS. 5a and 6a, respectively. The nomenclature $P_1$, $P_2$, $P_3$ ... depicts the position of a given byte in the payload. Each of packet payloads 500 and 600 include a search string 300 comprising the byte sequence depicted in FIGS. 3a and 3b. In general, a searched-for string may be located anywhere within a packet payload. Therefore, the search scheme must be flexible to identify whether any of the search strings in set S are present in the payload, regardless of location.

In a block 402, the hash value for the current hash key is calculated and compared with the hash key entries stored in the CAM. In FIG. 5a, the value for $L_{key}$ is 3, while the value for $L_{key}$ is 5 in FIG. 6a. Accordingly, the first hash result is derived by hashing the first three bytes of packet payload 500 (hash key $K_1$) using the same hash function that was used to generate the CAM entries in CAM 302A, while the first hash key $K_1$ for packet payload 600 (comprising the first five bytes of that payload) is hashed to produce the first hash result for the example of FIG. 6a.

In a decision block 404, a determination is made to whether the hash result generated in block 402 matches any values in the CAM. If there is not a match, the logic proceeds to a decision block 406 in which a determination is made to whether they are at least $L_{key}$ bytes left in the payload. If the answer is YES, the logic proceeds to a block 408 in which the current hash key is set to the next $L_{key}$ bytes in the payload, whereupon the process loops back to block 402 to evaluate this new hash key. The operation of blocks 402, 404, 406, and 408 are continued in a loop-wise manner until either the result of decision block 404 is YES or the result of decision block 406 is NO, indicating the end of the packet payload has been reached. If the end of the packet payload is reached without a match, there are no search strings present in the packet payload, as depicted by a block 410. The process then proceeds to continuation block 116 to continue normal packet processing operations.

For the purpose of illustration it is presumed that each of hash keys prior to the start of search string 300 (e.g., $K_1$, $K_2$, ... $K_J$) in FIG. 5a produce a miss (i.e., there is no match). The next hash key to compare is $K_{J+1}$, which includes the last byte before the start of search string 300 and the first two bytes of the search string. This likewise is presumed to produce a miss. The following hash key $K_{J+2}$ includes bytes $s_{13}$, $s_{14}$, and $s_{15}$. This is the same byte sequence from which CAM entry $C_3$ was derived. Accordingly, the comparison in decision block 404 returns a match (YES), and the logic proceeds to block 110 to perform Stage-2 processing, with a decision block 412 indicating whether the match corresponds to a true or false hit.

In the case of a specific search string (out of multiple possible search strings), a false hit causes the logic to return to decision block 406. In the case of a non-specified search string, a false hit (evaluated over all of the search strings) will cause the logic to proceed to block 410, indicating that none of the search strings are present in the packet payload.

If the hit is determined to be TRUE, the logic proceeds to block 114. Accordingly, a match-specific forwarding/handling process is performed in block 114 in the manner discussed above. Depending on what the handling process is designed to do, further processing may continue, as depicted by the dashed flow arrow to continuation block 116, or processing of the packet may be complete at this point.

The embodiment of FIG. 6a proceeds in a manner analogous to that shown in FIG. 5a and discussed above, except in this case the value of $L_{key}$ is set to 5. This produces a match for hash key $K_{J+2}$, which corresponds to CAM entry $C_4$ in CAM 302B. In addition to producing a match with the first set of CAM entries $306C_1$, each of CAM entries sets $306C_2$ and $306C_3$ would also yield a match. As before, all of the evaluations for hash keys $K_1$ through $K_{J+1}$ produce misses.

FIG. 5a also illustrates a potential additional match condition (depicted by the MATCH arrow with dashed lines). This is to show potential matches that might occur if the given set of entries in a CAM include the additional entries discussed above with reference to FIGS. 3c and 3d (e.g., the sets of $L_{key}$ entries outside of dashed boxes $304C_1$ and $306C_1$, such as any of CAM entry sets $304C_{4-6}$ in FIG. 5a).

The search strings and corresponding search results illustrated in FIGS. 5a and 6a illustrate generic search strings. Results for specific search strings are shown in FIGS. 5b-c and 6b-c. In these instances, the search string 502 being searched for in packet payloads 500A and 600A is "EVILINTERNETWORM", with corresponding CAM entries being stored in CAMs 504 and 602. For illustrative purposes, each byte shown in the packet payloads represents a corresponding ASCII 8-bit character.

Figure 5B:
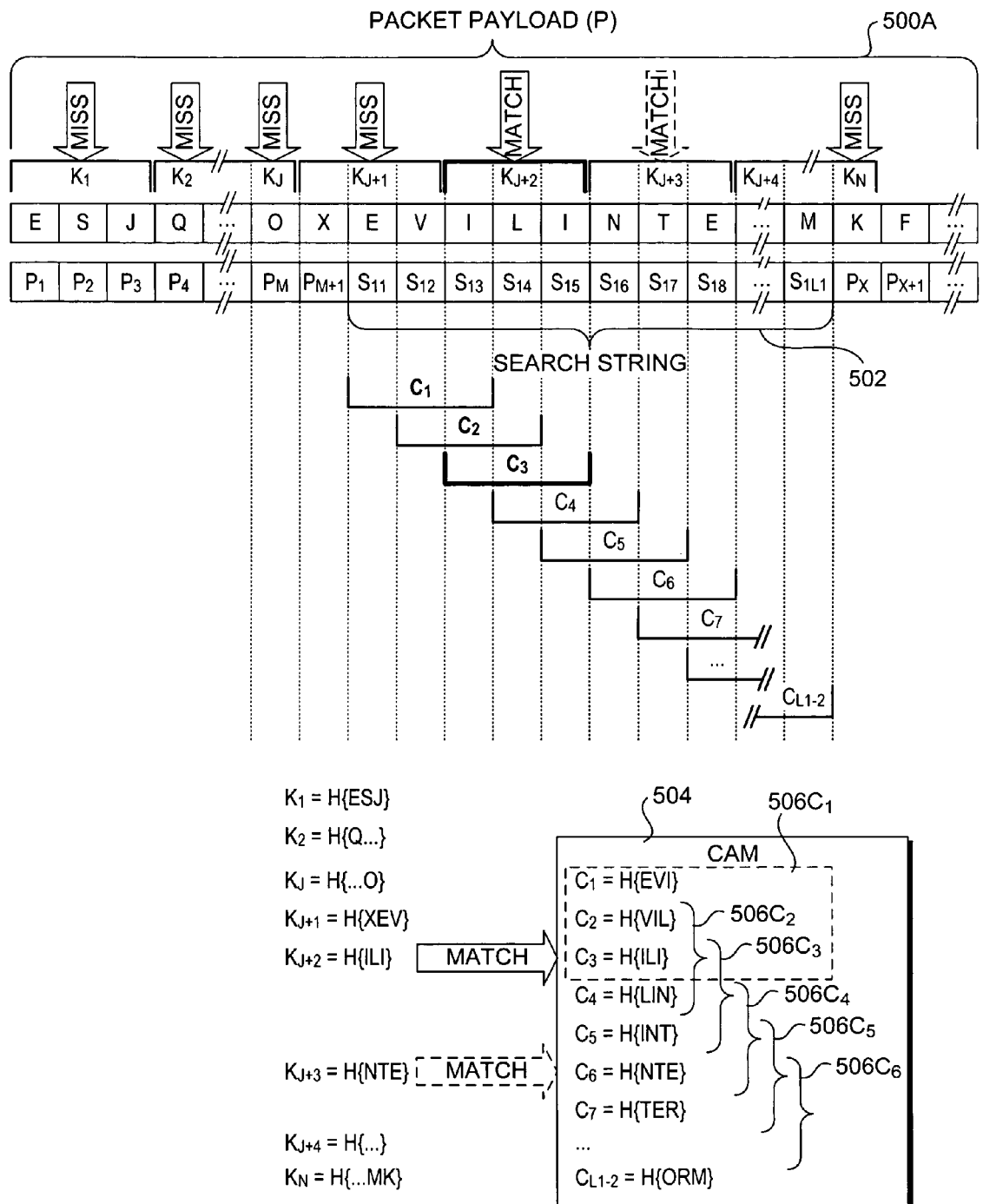
FIG. 5b is a schematic diagram illustrating an example of the search string verification process of FIG. 4a, wherein $L_{KEY}=3$ and a search is performed on a search string comprising an "EVILINTERNETWORM" ASCII 8-bit character byte sequence.

As shown in FIG. 5b, each of hash key $K_{J+2}$ and CAM entry $C_3$ are obtained by hashing the character sub-string "ILI", thus producing a match. An additional match might also occur for hash key $K_{J+3}$ and CAM entry $C_6$, which are generated by hashing the character sub-string "NTE". Thus, any of CAM entry sets $506C_{1-6}$ would produce a match. Similarly, as shown in FIG. 6b, hash key $K_{J+2}$ and CAM entry $C_4$ are obtained by hashing the character sub-string "LINTE", thus producing a match. Accordingly, any of CAM entry sets $604C_{1-4}$ would produce a match.

Figure 6C:
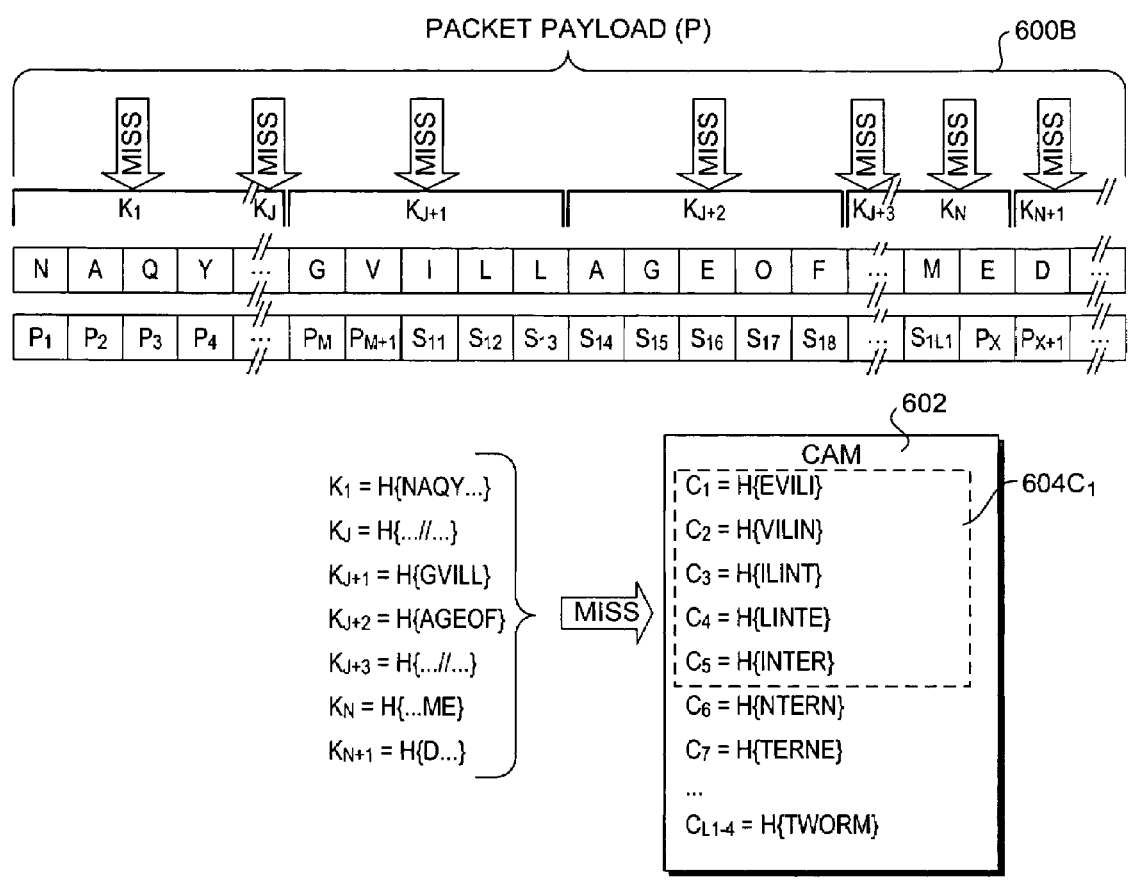
FIG. 6c is a schematic diagram illustrating an example of the search string verification process of FIG. 4a, wherein $L_{KEY}=5$ and a search is performed on the "EVILINTERNETWORM" search string, and wherein a search on a packet payload including a string comprising "VILLAGEOFTHEDAMNED" does not generate a false hit.

FIG. 5c illustrates an example of a false hit using a 3-byte value for $L_{key}$, while no match condition at the CAM level is detected on the same packet payload using the 5-byte value for $L_{key}$ shown in FIG. 6c. In FIG. 5c, the CAM entries for CAM 504 are the same as shown in FIG. 5b. During hash key comparisons, a match is determined for hash key $K_{J+1}$ (with CAM entry $C_2$), with each of the hashes derived from sub-string "VIL". However, this is a false hit, as the embedded string depicted in packet payload 500B is "VILLAGEOFTHEDAMNED" (partially not shown), which doesn't match the search string "EVILINTERNETWORM). This false hit would be determined during Stage-2 Analysis processing in the manner described below.

Now consider the same packet payload 600B using the 5-byte $L_{key}$ hash scheme of FIG. 6c. In this instance there are no matches between the hash results for the packet payload hash keys and the CAM entries in CAM 602. This illustrates the value of using a longer $L_{key}$ value. However, as discussed above, longer $L_{key}$ values result in slower hashes (generally) and require greater CAM storage space.

Faster Search Scheme

The basic scheme disclosed above requires a minimum of $L_{key}$ entries in the CAM for each string in S (without considering the possibility of duplicate entries). If the CAM memory complexity is increased to O($L_{SHORTEST}$), the payload search can be made faster by skipping a predetermined number of bytes between $L_{key}$ byte sub-strings rather than having to consider every sequential $L_{key}$ byte sub-string.

Figure 7A:
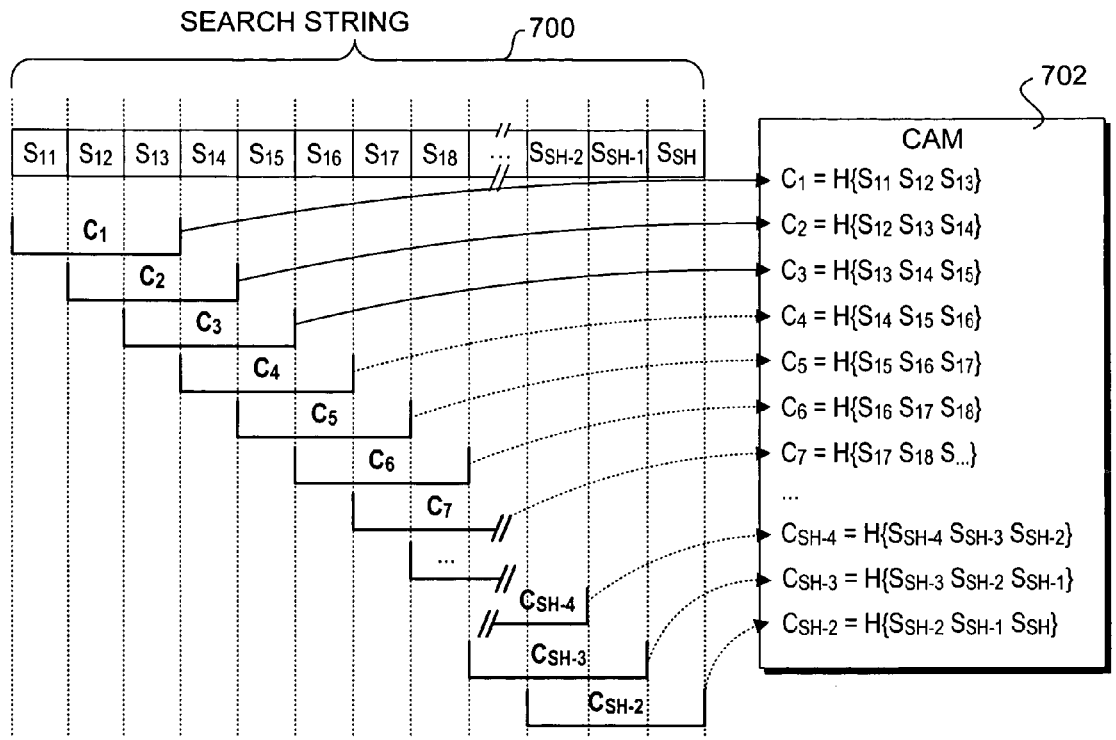
FIG. 7a is a schematic diagram illustrating a set of hash values generated by performing the process of FIG. 2b on a generic search string, wherein $L_{KEY}=3$.

With reference to FIG. 2b, the operations for generating the hash value entries stored in the CAM are similar to that discussed above in FIG. 2a, wherein like-numbered blocks in FIGS. 2a and 2b perform similar operations. However, in this instance, the number of hash values stored in the CAM is $L_{SHORTEST}-L_{KEY}+1$, as depicted in a decision block 208A. An exemplary set of CAM hash value entries generated for a search string 700 using the process of FIG. 2b is shown in FIG. 7a. The CAM hash value entries $C_1$ through $C_{SH-2}$ are calculated from 3-byte hash keys contained in search string 700 and stored in a CAM 702.

Figure 4B:
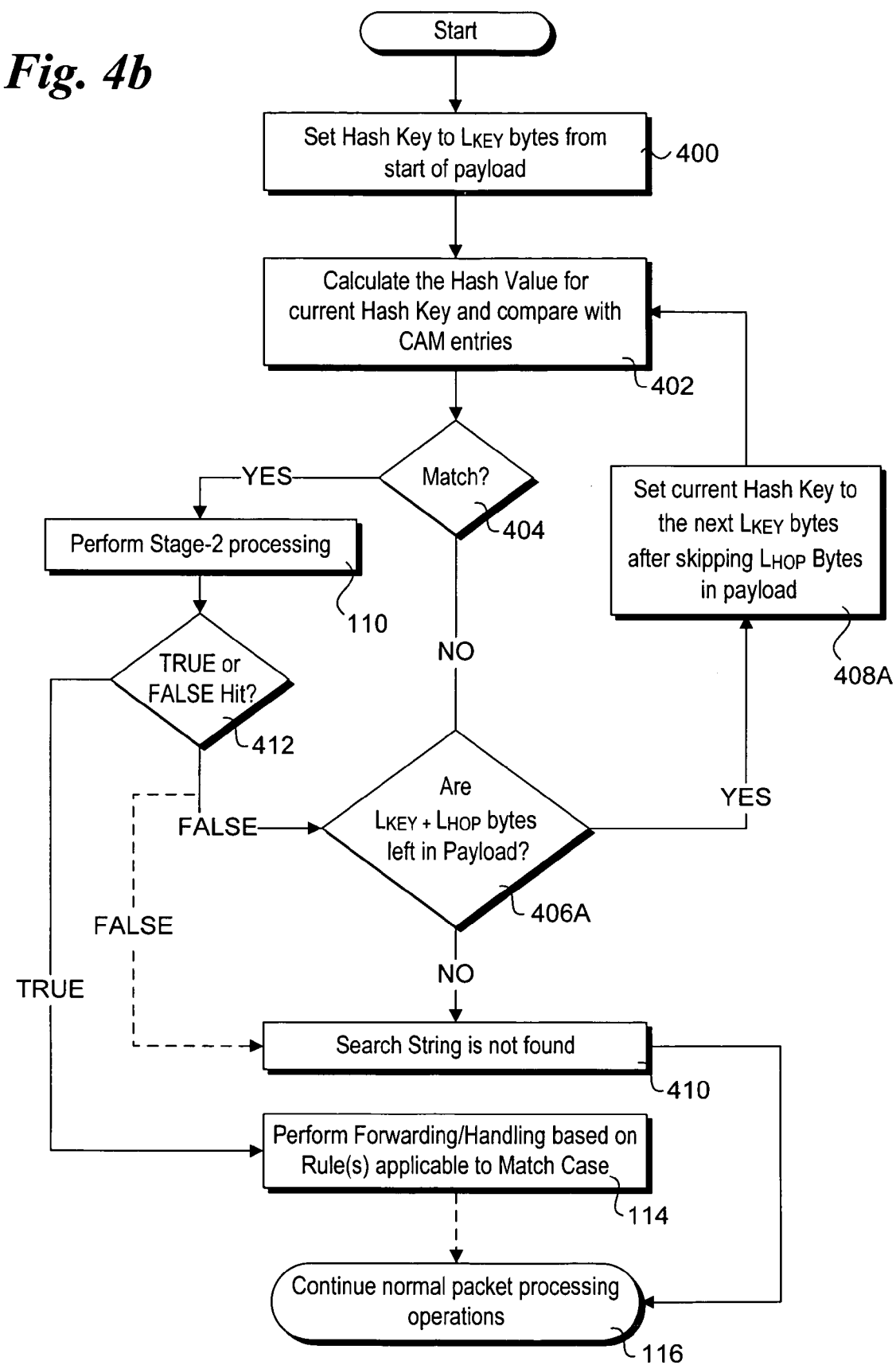
FIG. 4b is a flowchart illustrating operation and logic performed during one embodiment of run-time processing to verify the presence of a search string in a packet payload, wherein hash results derived from a reduced number of sub-strings separated by offsets are compared with hash values in the CAM.
Figure 7B:
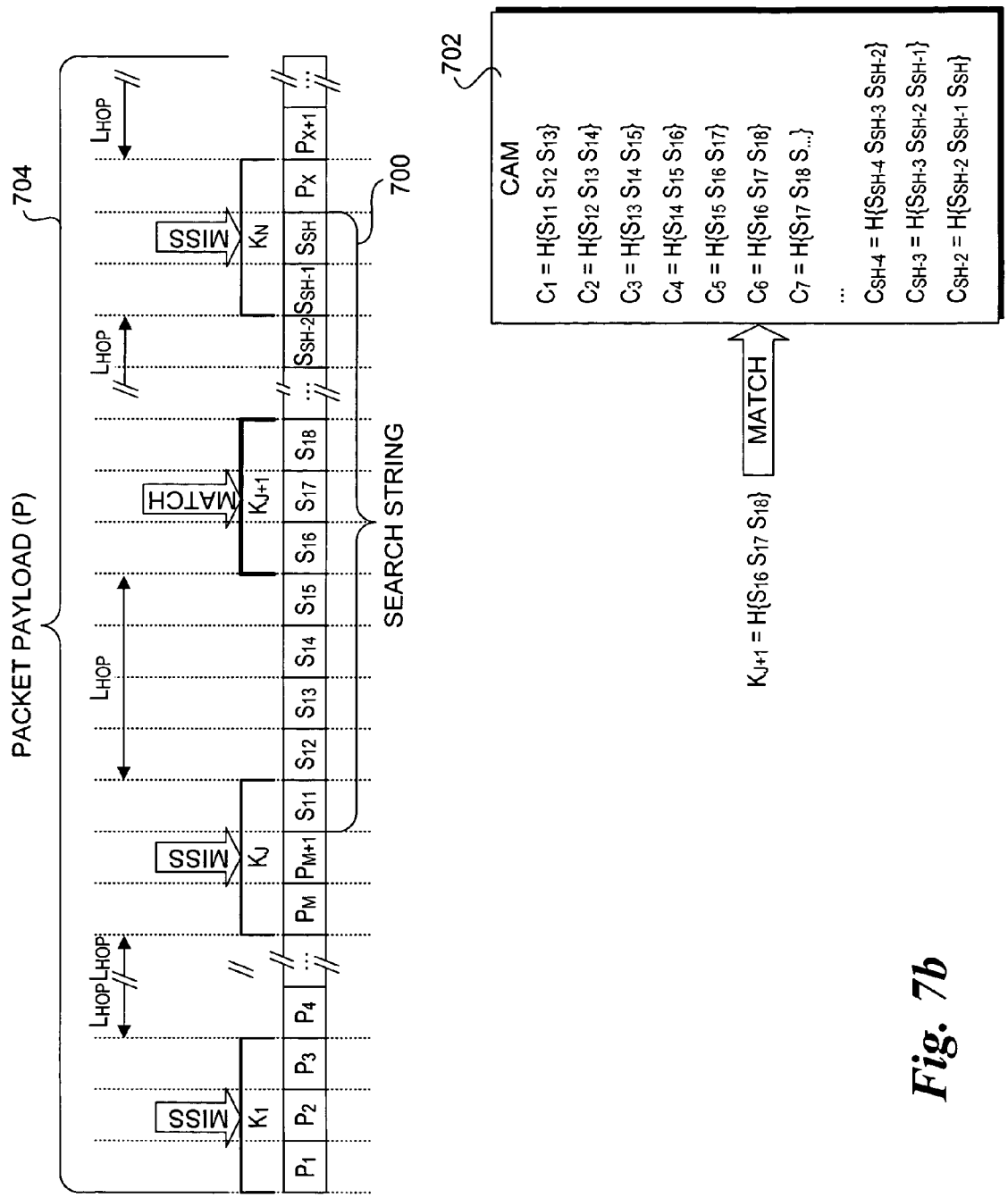

An example of performing a string search on a packet payload 704 using the skipping technique is shown in FIG. 7b, while a flowchart illustrating the operations and logic for performing the technique is shown in FIG. 4b. The packet payload search process begins in the same manner as above, wherein a hash is performed on a hash key $K_1$, which is a sub-string comprising the first $L_{KEY}$ bytes of packet payload 704. For purpose of illustration, it will be assumed that the hash result does not match any of the entries in CAM 702. However, instead of taking the next $L_{KEY}$ bytes as the next hash key, an $L_{HOP}$ number of bytes are skipped to locate the start of the next hash key, as depicted in a block 408A of FIG. 4b. This process is repeated until we reach hash key $K_J$. This hash key overlaps a portion of search string 700; however, there still is no match, as a complete overlap doesn't exist. Thus, the process loops back to block 408A, and another $L_{HOP}$ bytes of the payload are skipped to locate the start of hash key $K_{J+1}$. The hash result for hash key $K_{J+1}$ produces a match (with CAM entry $C_6$), thus producing a CAM hit. Accordingly, the process is forwarded to stage-2 analysis processing to verify whether or not the entirety of search string 700 is present in packet payload 704.

Under the foregoing scheme, $L_{HOP}$ is selected so as to produce the largest hop (number of bytes skipped) while still guaranteeing that a hash key will fall completely within the set of CAM entries that are stored. The $L_{HOP}$ can be chosen in such a way that, when there is a maximum overlap of a non-matching hash key and the search string, the next set of bytes chosen as the next hash key fall completely within the string. In one respect, the basic search scheme discussed above is a special case of the faster search scheme, wherein $L_{HOP}=0$. The maximum hop size can be determined by the following equation:

$$L_{HOP(max)}=L_{SHORTEST}-2*L_{KEY}+1 \qquad (b\ 2)$$

Optimizations

The discussion of the faster search algorithm presented above states there are $L_{SHORTEST}-L_{KEY}+1$ CAM entries for each string in set S. However, this figure merely represents the upper limit on the number of CAM entries per string. Depending on the particular search strings and their corresponding hash keys, the actual number of CAM entries that are needed may be reduced.

Figure 8:
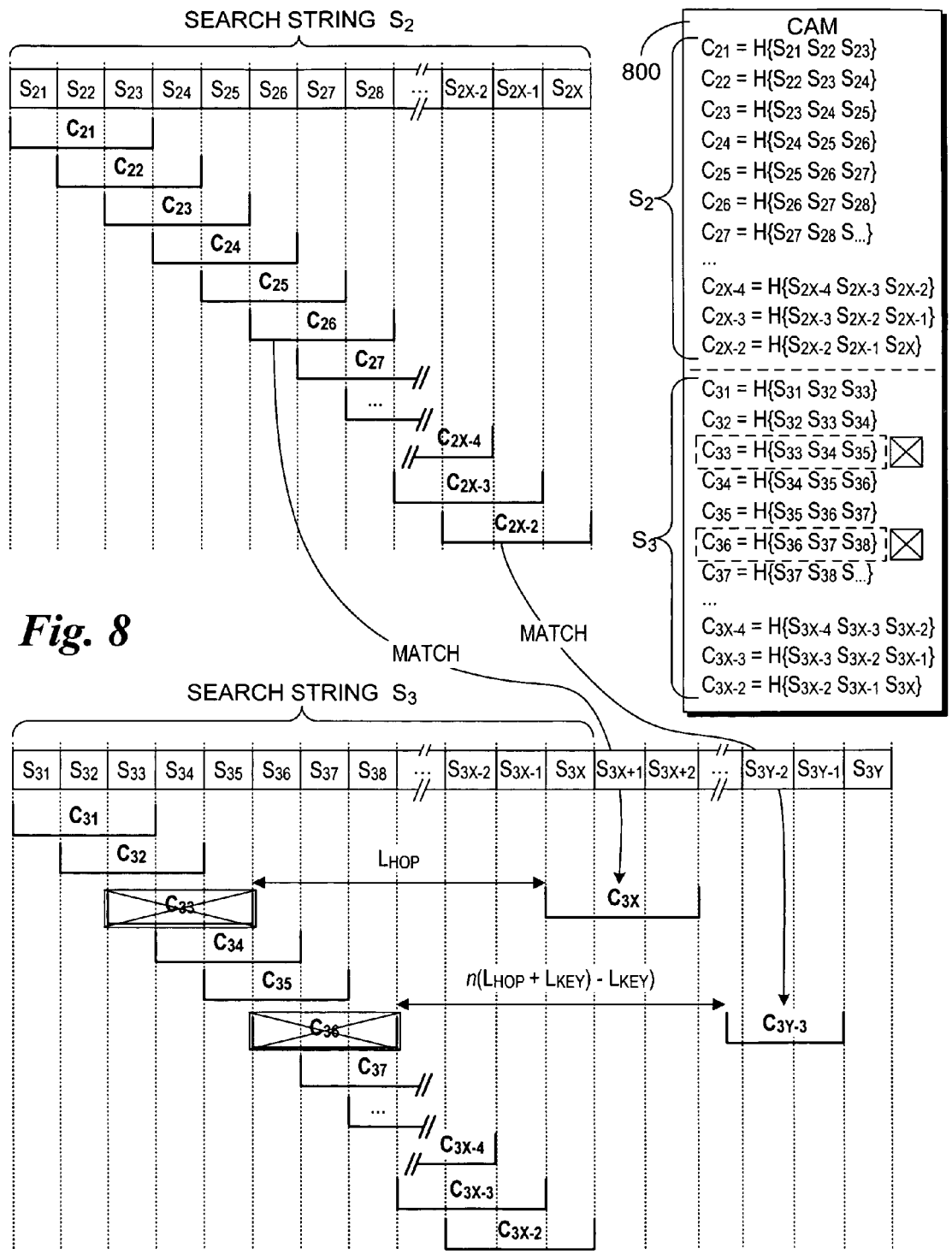
FIG. 8 is a schematic diagram illustrating one embodiment of an optimization scheme, wherein hash values may be removed from a combined set of hash values employed for searching multiple strings.

Let us considerer two arbitrarily chosen strings $S_2$ and $S_3$ from set S, wherein X is the length of $S_2$ and Y is the length of $S_3$, where Y>X. These strings are schematically illustrated in FIG. 8. The algorithm shown in FIG. 2b adds $L_{SHORTEST}-L_{KEY}+1$ CAM entries for each of strings $S_2$ and $S_3$ by choosing sub-strings comprising $L_{KEY}$ consecutive bytes to form the hash keys starting with the first byte and then advancing the "window" one byte at a time, as shown in a CAM 800 in FIG. 8.

Under one embodiment, the remaining sub-strings of $L_{KEY}$ bytes for the string are compared with the hash keys for the existing CAM entries. If there is a match, the CAM entry that is offset by $n(L_{HOP}+L_{KEY})-L_{KEY}$ bytes (number of bytes skipped depicted in FIG. 8), wherein n is an integer>0. In this instance, the term "offset" represents the distance (number of bytes) between the end of a given hash key and the start of the matching hash key. For example, if n=1, a hash key offset by $L_{HOP}$ of the matching hash key may be removed, as depicted by CAM entry $C_{33}$ in FIG. 8. The reason this will work is that if a packet payload search was to consider a hash key corresponding to a removed CAM entry, one of the subsequent hops (e.g., the next hop when n=1, second hop when n=2, etc.) for the search will land on another CAM entry, generating a CAM hit.

Another optimization relates to adjustment of the "effective" size of the shortest string. For example, under the CAM entry generation scheme of FIG. 2b, the number of CAM entries for the shortest string will be $L_{SHORTEST}-L_{KEY}+1$. This can be lowered by an arbitrary amount by reducing the value of $L_{SHORTEST}$ such that it is less than the length of the shortest string. (It is noted that $L_{SHORTEST}$ must still satisfy Equation 1.) As provided by the maximum hop size defined in Equation 2, a reduction in $L_{SHORTEST}$ will also result in a reduction in the maximum hop $L_{HOP(max)}$. Thus, the determination of an optimum size for $L_{SHORTEST}$ will involve some tradeoff between CAM requirements and the hop size.

Figure 9A:
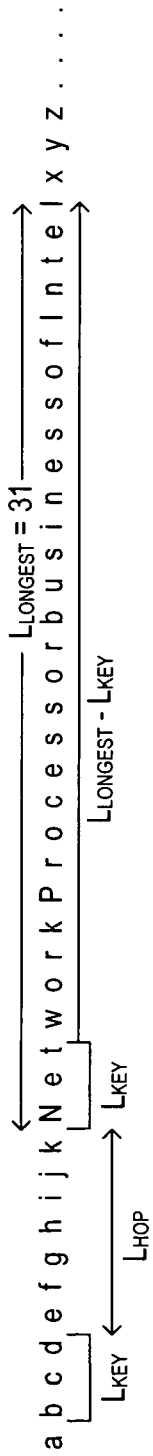
FIGS. 9a-c illustrate a technique for determining the minimum length of a sub-string that needs to be analyzed during Stage-2 analysis processing.
Figure 9B:
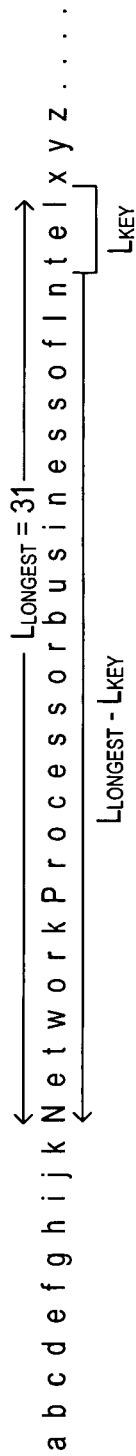

As discussed above, in response to a "hit" has been identified during Stage-1 pre-processing, the processing is forwarded to Stage-2 Analysis, wherein a more complete string comparison mechanism is performed to determine whether the hit corresponds to an exact match (True hit), or does not (False hit). When Stage 1 reports a hit, it means that one of the strings from set S may be present in the payload. This string may be the shortest string in set S, or the longest string, or any other string in-between. Stage 2 should, however, select the length of the substring for the worst case. The worst case is when the payload has the longest string embedded in it. Under this approach there are two extreme cases, as before. One extreme case occurs when the longest string is detected for a key combination that falls at the beginning of the string, such as illustrated in FIG. 9a. The other extreme case is when the string is detected when the key falls at the end of the longest string, as depicted in FIG. 9b. If the length of the substring for analysis is chosen considering these two extreme cases, all other cases will automatically be taken care of.

Figure 9C:
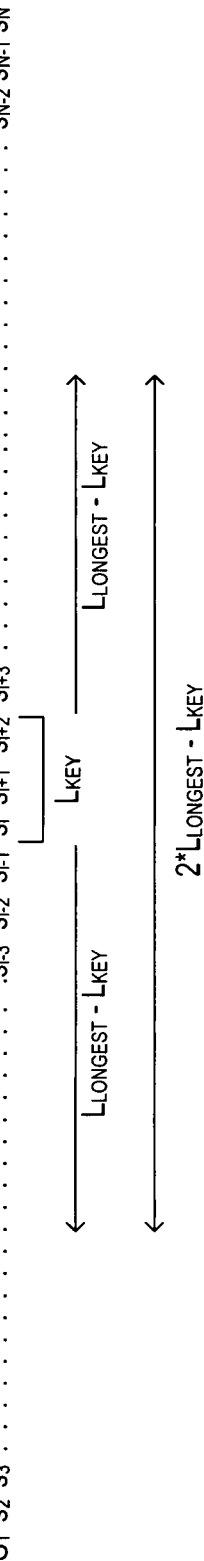

FIG. 9c shows the minimum length of the substring that must be used for analysis by Stage 2. When a key combination of $L_{KEY}$ bytes detects a hit in Stage 1, Stage 2 chooses the substring for analysis that is made up of $L_{LONGEST}-L_{KEY}$ bytes that occur before the first byte of the key, $L_{KEY}$ bytes that resulted in a hit in Stage 1, and $L_{LONGEST}-L_{KEY}$ bytes that occur after the last byte of $L_{KEY}$. Thus, the length of the substring chosen for analysis (in bytes) is:

$$L_{SUBSTRING} = L_{LONGEST} - L_{KEY} + L_{KEY} + L_{LONGEST} - L_{KEY} \quad (3)$$
$$= 2 * L_{LONGEST} - L_{KEY}$$

Once the substring is chosen, a window of $L_{LONGEST}$ bytes from the beginning of the substring is provided as input to a TCAM (Ternary Content Addressable Memory) in which a copy of the search strings in set S is stored. A TCAM is similar to a CAM, except that in a TCAM the value for a given bit position may be a 0, 1 or X (don't care). If the $L_{LONGEST}$ bytes contain any of the strings from set S, the TCAM gives a hit. Otherwise, $L_{LONGEST}$ bytes are again taken from the substring after skipping the first byte. The window of $L_{LONGEST}$ bytes thus slides along the substring. This process is repeated until the substring is entirely analyzed.

As discussed above, the substring chosen for analysis by Stage 2 may contain the longest, the shortest or any other string from set S. Accordingly, the mechanism of sliding the $L_{LONGEST}$ bytes along the substring will be repeated as many times as it takes to handle the worst case scenario. An example is shown in FIG. 10.

In the example, Stage 1 detects a hit for the key "wor". Since $L_{LONGEST}$ is 31 and $L_{KEY}$ is 3, Stage 2 chooses the substring length to be 2*31-3=59 bytes. Stage 2 then chooses the 31 bytes from the beginning of the substring and compares it with the TCAM entries, as depicted in a TCAM 1000. There is no hit in the TCAM and hence Stage 2 takes 31 bytes after skipping the first byte of the substring and compares it with TCAM entries.

This process is repeated and a hit is found when the 31 bytes starting from "Internetworms . . ." is compared with TCAM entries. Assuming the longest string is present at the end of the substring, the window of $L_{LONGEST}$ bytes slides over the substring for the following number of times to take care of the worst case:

$$N_{SLIDE} = 2 * L_{LONGEST} - L_{KEY} - L_{LONGEST} + 1 \quad (4)$$
$$= L_{LONGEST} - L_{KEY} + 1$$

Assuming that the number of packets carrying any of the strings from set S is only a small fraction of the total number of packets analyzed, the proposed mechanism runs at $O(N/(L_{KEY}+L_{HOP}))$ search operations per packet as against $O(N)$ for the traditional method when no string from set S is present in the payload. When the packet contains one string from set S, the complexity is $O(N/(L_{KEY}+L_{HOP})+N_{SLIDE})$. Overall complexity reduction is achieved by sliding the window of $L_{LONGEST}$ bytes on a part of the string identified by Stage 1 rather than on the whole string.

Optimization

In the above discussion, $L_{SUBSTRING}$ is shown to be $2*L_{LONGEST}-L_{KEY}$. This is because, when Stage 1 reports a hit, it does not know which string is potentially present in the payload. This can be overcome by storing the length of the string $L_{STR}$ along with the hash value in Stage 1 (in the CAM). When Stage 1 detects a hit, it passes the position in the payload where the hit was detected as well as the length that was stored along with the hash value for which the hit was detected. Stage 2 can then choose $L_{SUBSTRING}$ to be:

$$L_{SUBSTRING}=2*L_{STR}-L_{KEY} \quad (5)$$

In this case, $L_{SLIDE}$ is given by the following equation:

$$N_{SLIDE}=L_{STR}-L_{KEY}+1 \quad (6)$$

Stage-1 Pre-processing using Bloom Filters

In accordance with other embodiments, another two-stage process is now presented for identifying the presence of search strings in packet payloads. Under one aspect of this approach, a bloom filter mechanism is used to perform the pre-processing operations of the first stage. As before, if the bloom filter mechanism detects a hit, indicating a potential match might exist, processing is forwarded to the second string matching stage wherein a determination is made to whether a string in set S is actually present in the payload.

The use of Bloom filters for string detection is known in the art, and originate from the seminal paper written by B.

Bloom, "Space/Time Trade-Offs in Hash Coding with Allowable Errors," *Comm. ACM*, vol. 13, no. 7, May 1970, pp. 422-426. Moreover, techniques for performing string searching using parallel bloom filters, are discussed by S. Dharmapurikar et al., "Deep Packet Inspection using Parallel Bloom Filters," IEEE Micro, vol. 24, no. 1, January/February 2004, pp 52-61. For convenience and clarity, portions of the Dharmapurikar et al. are included in the discussion below.

Bloom filters comprise data structures that store multiple hash functions corresponding to and computed from respective members in a string search set. Under the Dharmapurikar et al. approach employed by one embodiment, the search strings, also called signatures, are grouped according to their length in bytes and stored in parallel Bloom filters. Each of these Bloom filters scans an input stream of bytes for the presence of strings corresponding to its length, with the scanning being performed in parallel. The Bloom filters are able to identify the existence of all matching strings. However, as before, a Bloom filter also may produce False hits.

Bloom filters use a randomized technique to test membership queries on a set of strings. Given a string X, the Bloom filter computes k hash functions on it producing hash values ranging from 1 to m. It then sets k bits in a m-bit long vector at the addresses corresponding to the k hash values. This procedure is repeated for all the members of the set to "program" the filter. The query process is similar to programming, where a string whose membership is to be verified is input to the filter. The Bloom filter generates k hash values using the same hash functions it used to program the filter. The bits in the m-bit long vector at the locations corresponding to the k hash values are looked up. If at least one of these k bits is found not set, then the string is declared to be a nonmember of the set. If all the bits are found to be set, then the string is said to belong to the set with a certain probability. This uncertainty in the membership comes from the fact that those k bits in the m-bit vector can be set by any of the members. Thus, finding a bit set does not necessarily imply that it was set by the particular string being queried. However, finding a bit not set certainly implies that the string does not belong to the set, since if it did then all the k bits would definitely have been set when the Bloom filter was programmed with that string. Accordingly, the Bloom filter can identify the absence of a particular string (or set of strings for that matter) with 100% certainty, while also identifying potential matches with a predictable probability that is less than 100%.

Figure 11:
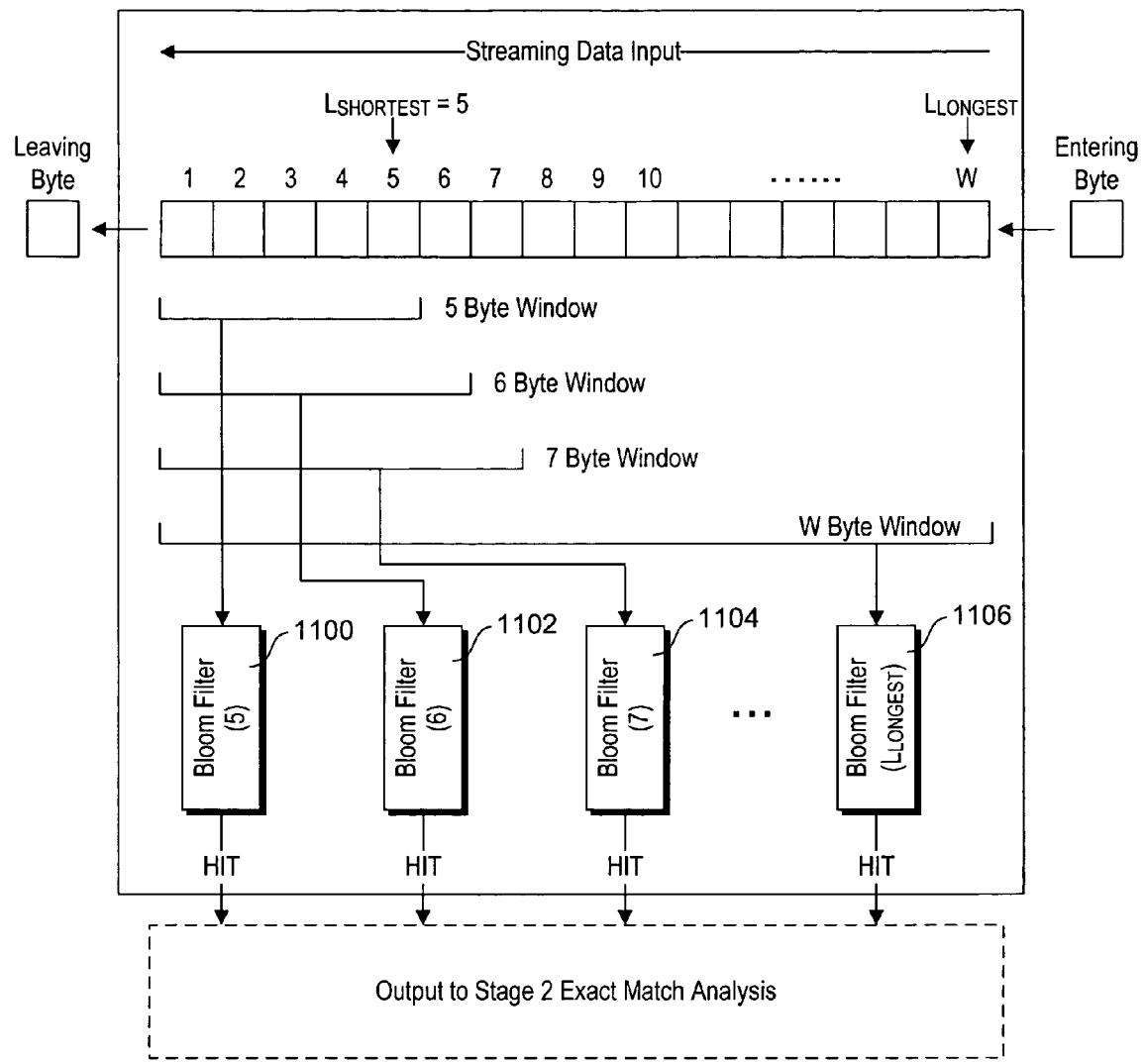
FIG. 11 is schematic diagram illustrating employment of a plurality of parallel Bloom filters for performing a first pre-processing stage, according to one embodiment.

A string search mechanism employing parallel Bloom filters is illustrated in FIG. 11. As discussed above, there will be one Bloom filter for each set of search string signatures having the same length. If there are not signatures of a given length, there will be no corresponding Bloom filters. The size of the Bloom filters will range from $L_{SHORTEST}$ to $L_{LONGEST}$. The exemplary Bloom filters shown in FIG. 11 include Bloom filters 1100, 1102, and 1104 having respective lengths of 5, 6, and 7 bytes, and a Bloom filter 1106 have a length of $L_{LONGEST}$ bytes.

Each Bloom filter reads a common input data stream, and employs a sampling window corresponding to the length of that Bloom filter. For example, the sampling window for Bloom filter 1100 will be 5 bytes in length, while the sampling window for Bloom filter 1106 will have a length of $L_{LONGEST}$ bytes. The data stream is advanced one byte for each sampling cycle. By monitoring the data stream in this manner, all the strings in Set S will be filtered by the Bloom filters.

As discussed above, the Bloom filters will produce an output (i.e., hit) when a hash value match for a particular filter is detected. However, there is not certainty that a hash value match will actually corresponding to an exact string match, as different strings can produce identical hash values. Accordingly, in response to a Bloom filter "hit," processing is advanced to Stage 2 exact match analysis.

Figure 12:
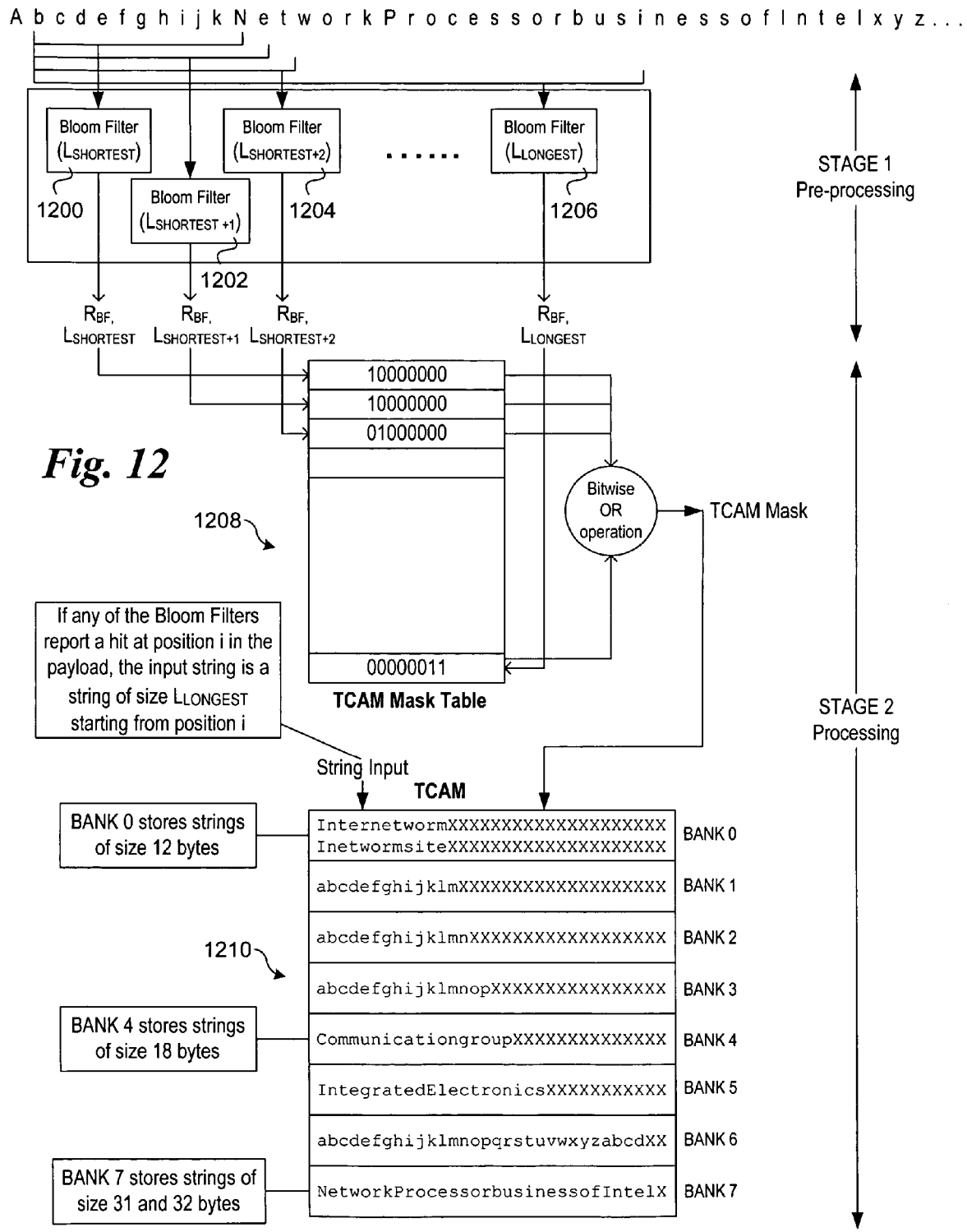
FIG. 12 is a schematic diagram illustrating further details of the embodiment of FIG. 11 pertaining to a second analysis stage under which a TCAM and TCAM Mask Table.

Details of one embodiment of a Stage-2 mechanism are shown in FIG. 12. The tope of the figure depicts Stage-1 pre-processing, and includes Bloom filters 1200, 1202, 1204, and 1206 having respective string (sampling window) lengths $L_{SHORTEST}$, $L_{SHORTEST+1}$, $L_{SHORTEST+2}$ and $L_{LONGEST}$. In general, there will be a Bloom filter having a string length $L_i$ for each unique string length in set S. $R_{BF}$, $L_i$ represents the output (i.e., result) for each Bloom filter.

To begin with, strings of length $L_{SHORTEST}$, $L_{SHORTEST+1}$ ... $L_{LONGEST}$ are considered from the beginning of the packet payload and are received as input by the corresponding Bloom Filters. If none of the Bloom Filters report a hit, another set of strings of length $L_{SHORTEST}$, $L_{SHORTEST+1}$ ... $L_{LONGEST}$ are considered from offset 1 of the packet payload (i.e. after skipping the first byte of the payload), thus advancing each filter's sampling window by one byte. If none of the Bloom Filters report a hit, strings from offset 2 are considered and so on.

When one or more Bloom Filters report a hit, processing proceeds to the Stage 2 components, as depicted in FIG. 12. These components include a TCAM Mask Table 1208 and a multi-bank TCAM 1210. The TCAM 1210 is capable of selectively enabling banks for a search. Generally, strings of the same length are stored in a common bank. However, if there are many strings of the same length, they may be stored in more than one bank in one embodiment. Additionally, it is not necessary that the banks must be adjacent in the TCAM under such an implementation. In yet another embodiment, a given bank may store strings of more than one length.

The TCAM Mask Table 1208 maintains information that is used to map a given hit to a corresponding TCAM bank in TCAM 1210. Each entry in TCAM Mask Table 1208 comprises a bitmap mask that is used to map that entry to one or more banks in TCAM 1210; these bitmap mask determine which banks must be searched in the TCAM for the corresponding Bloom filter hit. In the illustrated example, the number of banks in TCAM 1210 is eight, and thus the length of each bitmap is 8 bits long. This is merely illustrative, as other numbers of banks and bitmap lengths may be used in a similar manner. Meanwhile, each bitmap corresponds to a respective Bloom filter output, as illustrated in FIG. 12.

When a Bloom Filter reports a hit at location i in the packet payload, the TCAM Mask Table is consulted to get the TCAM bitmap mask applicable to that Bloom filter. It is also possible that multiple Bloom Filters report a hit. In this case, the bits in the TCAM bitmap mask corresponding to each Bloom Filter are bitwise ORed to get the final TCAM bitmap mask.

A string of length $L_{LONGEST}$ starting from position i (the position corresponds to the point where one or more Bloom Filters reported a hit) in the payload and the TCAM mask become inputs to the search operation. For a bitmap mask resulting in a single bit being set, the sting is compared with the entries stored in that bit's corresponding bank in TCAM 1210 to determine if a match exists. If multiple bits are set in the TCAM bitmap mask, then the entries in each of the corresponding banks are compared in parallel. If the Bloom Filter hit was true, the TCAM will get a hit during the search operation, otherwise there will not be a hit in the TCAM.

The foregoing two-stage Bloom filter scheme provides several advantages over known techniques using Bloom filters and otherwise. Under a conventional TCAM approach, an entire TCAM is searched, which may be relatively expensive in terms of latency, thus limiting line-rate speeds. However, under the multi-bank approach employed by the embodiments disclosed herein, only a small fraction (e.g., a single bank) need be searched. Moreover, this save power consumption, which is generally proportional to the number of entries searched. Since the portion of the TCAM to be searched is much smaller, the corresponding power consumption is likewise much smaller.

Exemplary Hardware Implementations

Figure 13:
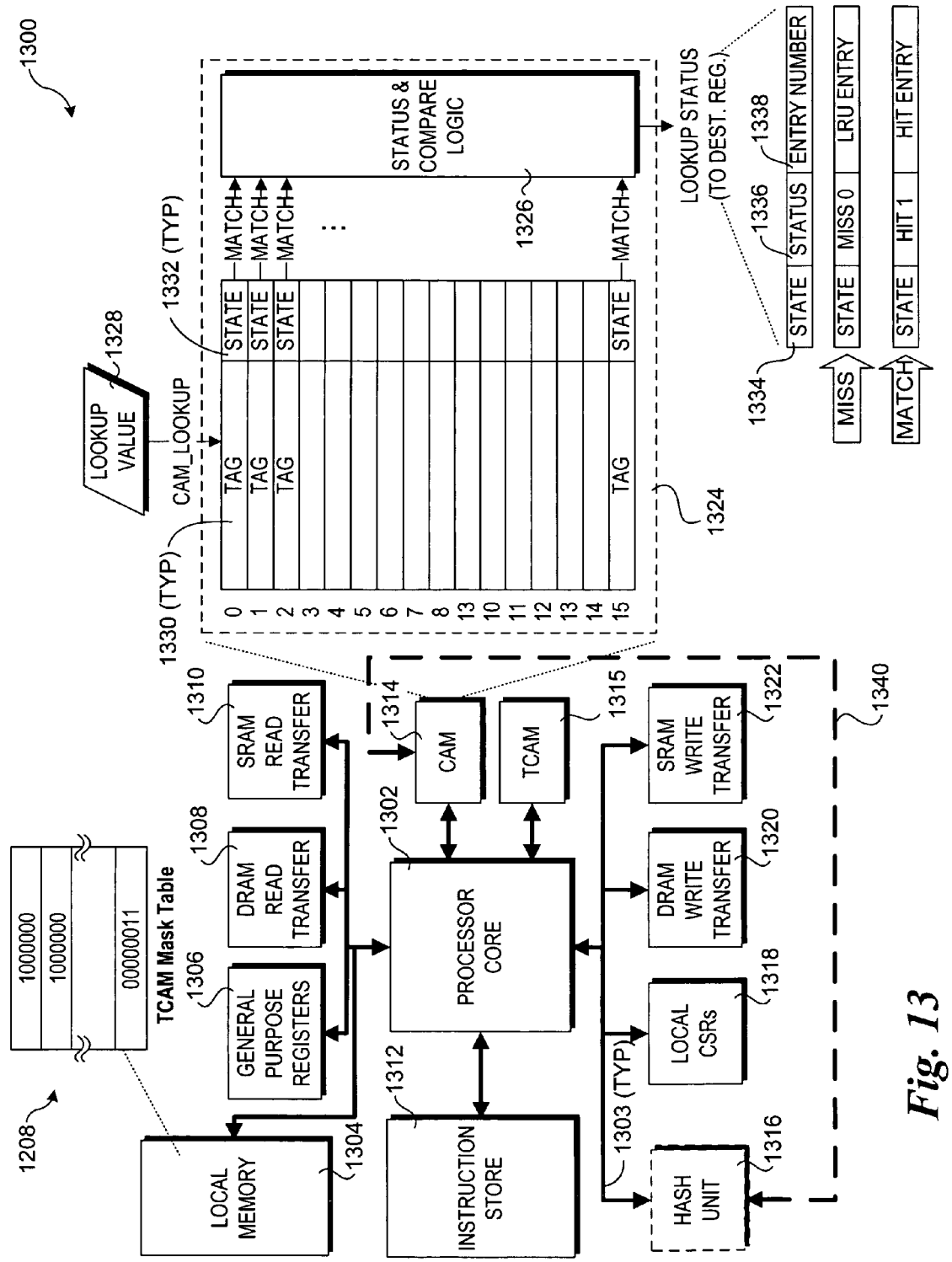
FIG. 13 is schematic diagram of a compute engine including a CAM and a TCAM, according to one embodiment of the invention.

FIG. 13 shows one embodiment of a microengine 1300 that may be employed for performing the string search operations described herein. At the heart of microengine 1300 is a processor core 1302. The processor core includes the functional units to perform processor operations such as shift, add, subtract, multiple, etc. Processor core 1302 is connected to various components via appropriate data and control buses, which are depicted as individual connectors 1303 for clarity. These components include local memory 1304, general-purpose registers 1306, a DRAM read transfer registers 1308, a SRAM read transfer registers 1310, an instruction store 1312, a CAM 1314, a TCAM 1315, an optional hash unit 1316, local control and status registers (CSRs) 1318, a DRAM write transfer registers 1320, and an SRAM transfer registers 1322.

Further details of CAM 1314 are depicted toward the right side of FIG. 13. The CAM includes a memory array 1324 in which multiple CAM entries are stored. In the illustrated embodiment, memory array 1324 includes 16 entries; however, this is merely exemplary, as the number of entries supported by the CAM will depend on the targeted usage for the CAM. The memory array 1324 is coupled to status and compare logic 1326, which is used to control CAM operations and produce output data in response to comparing a lookup value 1328 provide to the CAM's input port. In the illustrated embodiment, each CAM entry includes a tag field 1330 and a state field 1332. In one embodiment, tag field 1330 is a 32-bit field, while state field 1332 is a 4-bit field. Other field widths may also be employed.

A CAM functions as an associative cache array, wherein the values in tag field 1330 comprise the actual data to be searched from, hence the name "content addressable memory." In response to an input lookup value presented at the CAM's input register (port), the CAM performs a parallel search of all its entries (via their respective tag field values) and determines whether or not a match exists. The lookup status output by status and compare logic 1326 indicates whether or not a match was found, and if so, the location of the match. In one embodiment, a 9-bit return value is provided by the lookup status, and stored in an appropriate destination registers (e.g., a local CSR). The return value includes a state field 1334 (matching the data in state field 1332), a status bit 1336, and an entry number field 1338. The status bit is used to identify a CAM hit or miss. In one embodiment, the value in the entry number field 1338 for a CAM miss identifies the least recently used CAM entry. In response to a CAM hit, the location of the matching CAM entry is loaded into entry number field 1338.

In one embodiment, the output of hash unit 1316 is operatively-coupled to the input of CAM 1314, as depicted by dashed connector 1340. For example, in one embodiment the hash unit includes an output register that serves an in input register to the CAM. One advantage to this architecture is that the output of hash unit 1316 can be provided directly to CAM 1314 without having to be passed through the datapath for processor core 1302, thus saving valuable process cycles.

TCAM 1315 functions in a manner similar to CAM 1314, except that the bit values in a TCAM may include not only a 1 and 0, but also an X (don't care). As discussed above and illustrated in FIG. 12, each entry in the TCAM will comprise a member of set S. Furthermore, the most significant bytes of the entry will contain the search string character (i.e., ASCII single byte) values for the string, will the remaining bytes will comprises don't care (X) values to pad out the width of the TCAM.

In general, the size (including the width and depth (number of entries)) of the TCAM may vary depending on the particular implementation requirements. In some instances, a TCAM of fixed size may be reconfigured (programmatically) to change its width and depth. In addition, the TCAM may be local to a given ME (as depicted in FIG. 13), or be shared by multiple ME's (as discussed below with reference to FIG. 15). Moreover, a shared TCAM may either be on-chip or off-chip, with the latter configuration accessed via an appropriate interface.

Under embodiments that employ parallel Bloom filters for Stage-1 pre-processing, a TCAM Mask Table 1208 will typically be cached in local memory 1304, as illustrated in FIG. 13. Alternatively, a TCAM Mask Table may be stored in a shared memory resource, such as on-chip SRAM, off-chip SRAM, or off-chip DRAM. In general, the TCAM Mask Table may be stored as a corresponding data structure in its host memory. The size of the TCAM Mask Table, including its width and depth, may vary in view of the requirements for a particular implementation.

In one embodiment, computational resources that effect Control Plane operations shall be responsible to add/delete strings into TCAM 1315 and program the Bloom filters. These Control Plane components will also update the entries in TCAM Mask Table 1208. The fast path (Data Plane) implementation in the microengines will access data from TCAM 1315 and TCAM Mask Table 1208, but will not alter these tables.

In accordance with further aspects of some embodiments, Stage-1 and Stage-2 operations are performed substantially concurrently using multiple instructions threads that are executed in a parallel pipelined manner. This approach enables portions of the overall packet processing operations to be performed by respective compute engines (via multiple threads running on these compute engines) in parallel so as to support line rate speeds, wherein packet payload search operations are performed in the data plane.

In further detail, modern network processors employ multiple multi-threaded processing cores (e.g., microengines) to facilitate line-rate packet processing operations. Some of the operations on packets are well-defined, with minimal interface to other functions or strict order implementation. Examples include update-of-packet-state information, such as the current address of packet data in a DRAM buffer for sequential segments of a packet, updating linked-list pointers while enqueuing/dequeuing for transmit, and policing or marking packets of a connection flow. In these cases the operations can be performed within the predefined-cycle stage budget. In contrast, difficulties may arise in keeping operations on successive packets in strict order and at the same time achieving cycle budget across many stages. A block of code performing this type of functionality is called a context pipe stage.

Figure 14:
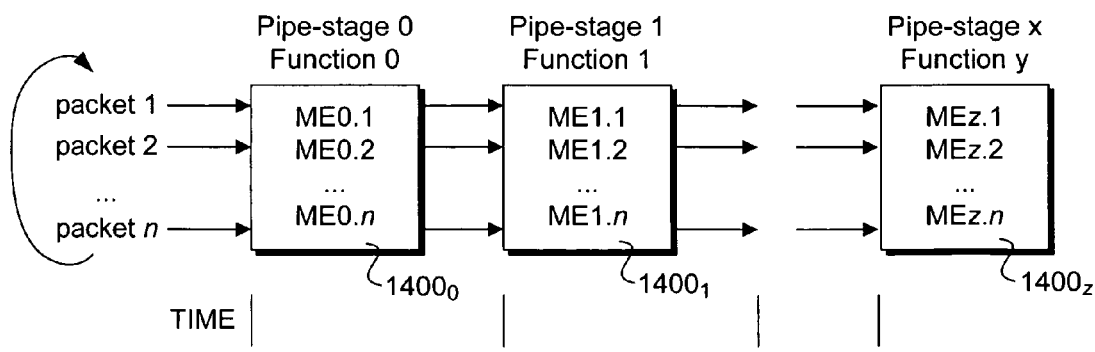
FIG. 14 is a schematic diagram illustrating a technique for performing multiple functions via multiple compute engines using a context pipeline.

In a context pipeline, different functions are performed on different microengines (MEs) as time progresses, and the packet context is passed between the functions or MEs, as shown in FIG. 14. Under the illustrated configuration, z MEs $1400_{0-z}$ are used for packet processing operations, with each ME running n threads. Each ME constitutes a context pipe stage corresponding to a respective function executed by that ME. Cascading two or more context pipe stages constitutes a context pipeline. The name context pipeline is derived from the observation that it is the context that moves through the pipeline.

Under a context pipeline, each thread in an ME is assigned a packet, and each thread performs the same function but on different packets. As packets arrive, they are assigned to the ME threads in strict order. For example, there are eight threads typically assigned in an Intel IXP2800® ME context pipe stage. Each of the eight packets assigned to the eight threads must complete its first pipe stage within the arrival rate of all eight packets. Under the nomenclature illustrated in FIG. 1, MEi.j, i corresponds to the ith ME number, while j corresponds to the jth thread running on the ith ME.

A more advanced context pipelining technique employs interleaved phased piping. This technique interleaves multiple packets on the same thread, spaced eight packets apart (in one embodiment). An example would be ME0.1 completing pipe-stage 0 work on packet 1, while starting pipe-stage 0 work on packet 9. Similarly, ME0.2 would be working on packet 2 and 10. In effect, 16 packets would be processed in a pipe stage at one time. Pipe-stage 0 must still advance every 8-packet arrival rates. The advantage of interleaving is that memory latency is covered by a complete 8 packet arrival rate.

Under a functional pipeline, the context remains with an ME while different functions are performed on the packet as time progresses. The ME execution time is divided into n pipe stages, and each pipe stage performs a different function. As with the context pipeline, packets are assigned to the ME threads in strict order. There is little benefit to dividing a single ME execution time into functional pipe stages. The real benefit comes from having more than one ME execute the same functional pipeline in parallel.

In view of one or more of the foregoing pipeline processing techniques, packet payload searches may be implemented while still supporting line-rate packet forwarding. In this instance, one or more threads running on one or more microengines will be employed for searching operations in accordance with the techniques disclosed herein. The software for performing the string searches will be loaded into instruction store 1312 and executed as an instruction thread on processor core 1302 at run-time. Prior to this, appropriate hash values (derived for the search strings) will be generated and loaded into CAM 1314 and appropriate search strings will be loaded into TCAM 1315. The processing (latency) budget for string search operations should be selected so that line-rate processing will not be hampered for packets that do not contain strings corresponding to the strings defined for an applicable search string set. At the same time, handling of packets having matching strings are forwarded to applicable Stage-2 processing operations, which are typically performed by other threads/ME's in a context or functional pipeline at line-rate speeds.

Under one embodiment, Bloom filters are implemented via respective threads running on one or more microengines. Under the foregoing parallel pipelined approach, the Bloom filters are implemented substantially concurrently for each filter cycle (i.e., each position in the received data stream that is being evaluated). In one embodiment, the microengine(s) that implement(s) the Bloom filters may locally cache the TCAM mask table in their local memory for faster access.

Figure 15:
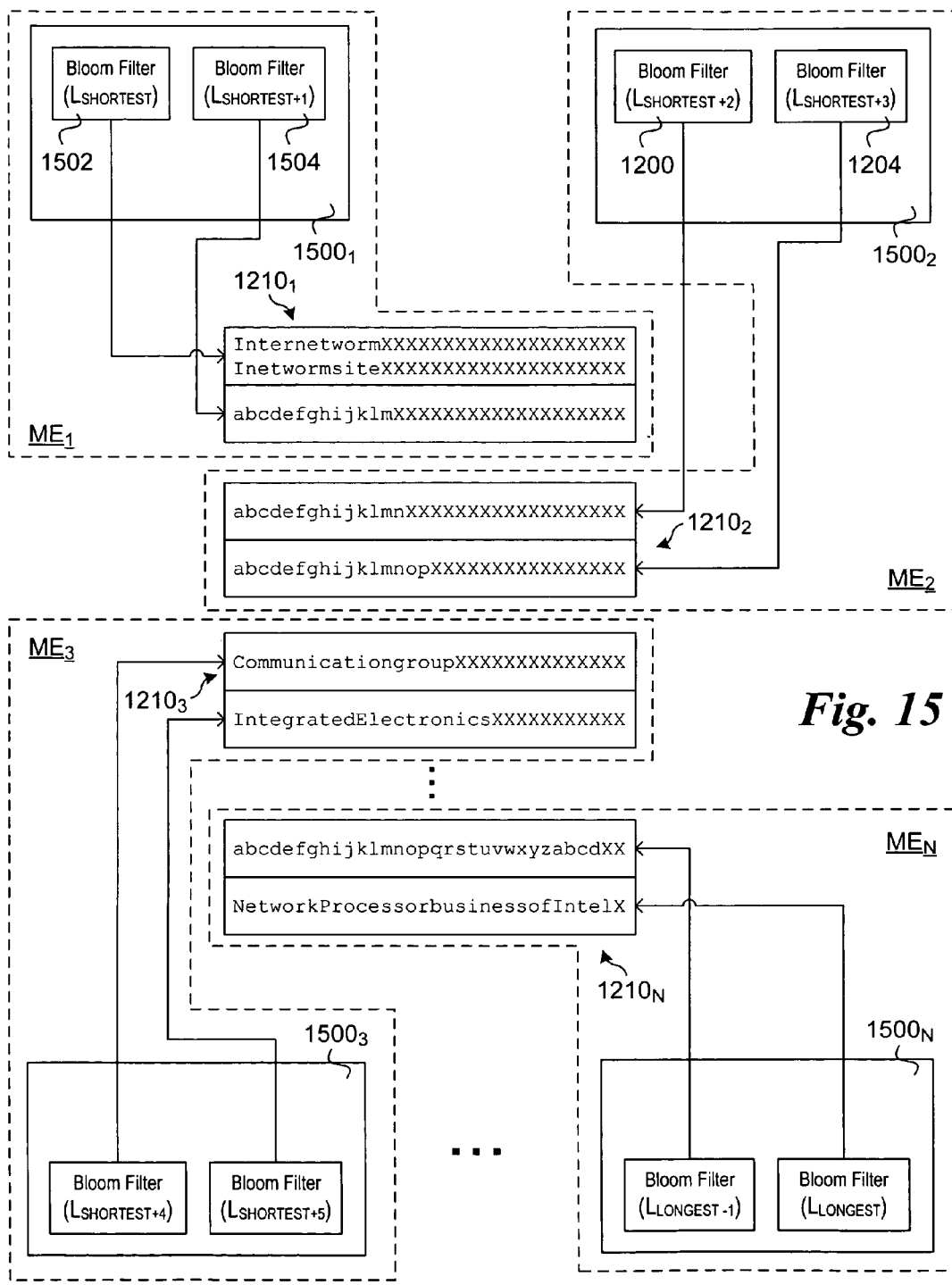
FIG. 15 is a schematic diagram illustrating a Bloom filter and TCAM implementation on multiple microengines.

In another embodiment, Bloom filter processing and corresponding TCAM storage is segregated across multiple microengines. For example, such a scheme is shown in FIG. 15, which depicts multiple microengines $ME_1$, $ME_2$, $ME_3$, and $ME_N$. Each of these microengines is employed for facilitating a respective set of Bloom filters, as depicted by Bloom filter sets $1500_1$, $1500_2$, $1500_3$ and $1500_N$. In one embodiment, each Bloom filter is facilitated by executing a corresponding instruction thread on its host ME.

As further depicted in FIG. 15, each of microengines $ME_1$, $ME_2$, $ME_3$, and $ME_N$ includes a respective TCAM $1210_1$, $1210_2$, $1210_3$ and $1210_N$ in which TCAM entries corresponding to the set of Bloom filters facilitated by that ME are stored. In one embodiment, each TCAM is partitioned into multiple banks, with each bank storing entries corresponding to a respective Bloom filter. For example, a hit result from a Bloom filter 1502 will produce a Stage-2 lookup in a first bank of TCAM $1210_1$, while a hit result from a Bloom filter 1504 will produce a Stage-2 lookup in a second bank of TCAM $1210_1$. In another embodiment, the entries for all or a portion of the TCAMs are grouped into a single bank.

In yet another embodiment, aspect of the schemes of FIGS. 15 and 12 are combined. Under this approach, one or more of TCAMs $1210_1$, $1210_2$, $1210_3$ and $1210_N$ are partitioned into multiple banks, and a corresponding TCAM Mask Table is employed for mapping Bloom filter hits to corresponding banks in a TCAM for lookup.

FIG. 16 shows an exemplary implementation of a network processor 1600 that employs multiple microengines 1300. In this implementation, network processor 1600 is employed in a line card 1602. In general, line card 1602 is illustrative of various types of network element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 1604. In general, backplane interface 1604 supports various input/output (I/O) communication channels, as well as provides power to line card 1602. For simplicity, only selected I/O interfaces are shown in FIG. 16, although it will be understood that other I/O and power input interfaces may also exist.

Network processor 1600 includes n microengines that are configured in one or more clusters. In one embodiment, n=8, while in other embodiment n=16, 24, or 32. Other numbers of microengines may also be used. In the illustrated embodiment, 16 microengines 1300 are shown grouped into two clusters of 8 microengines, including an ME cluster 0 and an ME cluster 1. In the embodiment illustrated in FIG. 16, the output from a given microengine is "forwarded" to a next microengine in a manner that supports pipelined operations. However, this is merely exemplary, as the microengines may be arranged in one of many different configurations.

In general, the microengines for network processor 1600 may have the architecture shown in FIG. 1300, including a local hash unit 1316, or may omit a local hash unit. Furthermore, a portion of the microengines configured for performing string search operations may include a local hash unit, while other microengines may not. Additionally, the size of the CAMs and/or TCAMs for a microengine configured for performing string search operations may be substantially larger than the CAMs and/or TCAMs used for other microengines that are not configured for performing string searches.

Each of microengine clusters 0 and 1 is connected to other network processor components via sets of bus and control lines referred to as the processor "chassis" or "chassis interconnect". For clarity, these bus sets and control lines are depicted as an internal interconnect 1612. Also connected to the internal interconnect are an SRAM controller 1614, a DRAM controller 1616, a general-purpose processor 1618, a media and switch fabric interface 1620, a PCI (peripheral component interconnect) controller 1621, scratch memory 1622, and a hash unit 1623. Other components not shown that may be provided by network processor 1600 include, but are not limited to, encryption units, a CAP (Control Status Register Access Proxy) unit, and a performance monitor.

The SRAM controller 1614 is used to access an external SRAM store 1624 via an SRAM interface 1626. Similarly, DRAM controller 1616 is used to access an external DRAM store 1628 via a DRAM interface 1630. In one embodiment, DRAM store 1628 employs DDR (double data rate) DRAM. In other embodiment DRAM store may employ Rambus DRAM (RDRAM) or reduced-latency DRAM (RLDRAM).

General-purpose processor 1618 may be employed for various network processor operations. In one embodiment, control plane (e.g., slow path) operations are facilitated by software executing on general-purpose processor 1618, while data plane (e.g., fast path) operations are primarily facilitated by instruction threads executing on the microengines.

Media and switch fabric interface 1620 is used to interface with the media I/O and switch fabric for the network element in which the line card is installed. In one embodiment, media and switch fabric interface 1620 employs a System Packet Level Interface 4 Phase 2 (SPI4-2) interface 1632. In general, the actual switch fabric may be hosted by one or more separate line cards, or may be built into the chassis backplane. Both of these configurations are illustrated by switch fabric 1634.

PCI controller 1622 enables the network processor to interface with one or more PCI devices that are coupled to backplane interface 1604 via a PCI interface 1636. In one embodiment, PCI interface 1636 comprises a PCI Express interface.

As an option to the local TCAM implementation of FIG. 1300, on or more "global" TCAMs may be shared by the various MEs. This is schematically represented by a TCAM 1625 in FIG. 16, which is shown as an on-chip component. It is further noted that in one embodiment an external TCAM may be employed for shared TCAM purposes. Such a configuration would be advantageous for implementations requiring a large amount of TCAM storage. An example of such an implementation is depicted as a TCAM 1627 in FIG. 16, which is accessed via one channel of SRAM interface 1626.

During initialization, coded instructions (e.g., microcode) to facilitate the packet-processing functions and operations described above, including packet payload string searching operations, are loaded into appropriate control stores for the microengines. In one embodiment, the instructions are loaded from a non-volatile store 1638 hosted by line card 1602, such as a flash memory device. Other examples of non-volatile stores include read-only memories (ROMs), programmable ROMs (PROMs), and electronically erasable PROMs (EEPROMs). In one embodiment, non-volatile store 1638 is accessed by general-purpose processor 1618 via an interface 1640. In another embodiment, non-volatile store 1638 may be accessed via an interface (not shown) coupled to internal interconnect 1612.

In addition to loading the instructions from a local (to line card 1602) store, instructions may be loaded from an external source. For example, in one embodiment, the instructions are stored on a disk drive 1642 hosted by another line card (not shown) or otherwise provided by the network element in which line card 1602 is installed. In yet another embodiment, the instructions are downloaded from a remote server or the like via a network 1644 as a carrier wave.

In one embodiment, none of the microengines includes a local hash unit 1316. Rather, hash unit 1623 is shared across one or more microengines that are used for performing packet payload string searches in accordance with the embodiments described herein.

Typically, during initialization of network processor 1600 or line card 1602, various CAM entries and TCAM entries are respectively loaded into CAMs 1314 and TCAMS 1315 of selected microengines 1300. The CAM entries will typically include hash values calculated from corresponding hash key sub-strings comprising selected portions of search strings, and are generated in accordance with the techniques taught herein. Meanwhile, the TCAM entries will comprise search strings (with padding, as necessary) corresponding to the search string set S. Optionally, an original set or updated CAM and/or TCAM entries may be dynamically loaded into one or more CAMs during run-time operations, e.g., via Control Plane operations. During run-time operations, one or more threads executing on one or more microengines will be used to search for strings in the payloads of received packets using the two-stage pre-processing and analysis mechanisms disclosed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   defining a set of S search strings comprising strings to be searched in a packet payload;
   storing data corresponding to the search strings in set S in at least one Ternary Content Addressable Memory (TCAM);
   computing hashes on at least one of the search strings in set S and sub-strings of those search strings and storing the hashes in a memory;
   in response to receiving a packet including a payload,
   performing a first pre-processing stage employing the hashes stored in the memory to identify any sub-string in the payload that might match a search string in set 5, identification of such a sub-string producing a hit; and
   performing a second analysis stage in response to the hit, the second analysis stage verifying an existence of an exact match of a search string in set S via use of the at least one TCAM, wherein the second analysis stage includes:
   identifying a portion in the packet payload in which an exact match might exist;
   determining a minimum length of a sub-string corresponding to the portion of packet payload to be searched;
   generating search string hash values by hashing each of a plurality of hash keys comprising sub-strings of a search string having a fixed length $L_{KEY}$; and determining the minimum length $L_{SUBSTRING}$ of the sub-string corresponding to the portion of the packet payload to be searched by use of an equation:

$$L_{SUBSTRING}=2*L_{LONGEST}-L_{KEY}$$

wherein $L_{LONGEST}$ corresponds to the length of the longest search string in set S.

2. The method of claim 1, wherein the first pre-processing stage further comprises:
  performing a hash on each of a plurality of sub-string hash keys in a search string to generate respective search string hash values for the search string;
  storing the search string hash values in a memory; and
  determining if the packet payload might include the search string by,
    performing a hash on each of one or more sub-strings in the packet payload; and
    determining if a hash result from a hash on a packet payload sub-string matches one of the search string hash values in memory,
  wherein the search string is verified to not be present in the packet payload if there are no matches between a hash result and the search string hash values.

3. The method of claim 1, further comprising:
  performing the first pre-processing stage using a first set of pipelined fast path operations implemented via execution of one or more execution threads on a network processor; and
  in response to hit output by the first pre-processing stage, performing the second analysis stage using a second set of pipelined fast path operations implemented via execution of one or more execution threads on the network processor.

4. The method of claim 1, wherein the memory comprises a content addressable memory (CAM) and the search string hash values stored in the CAM comprise CAM entries, the method further comprising:
  performing a parallel search of a hash result against the CAM entries to determine if the hash result matches one of the search string hash values.

5. The method of claim 4, further comprising:
  performing a hash on each of a plurality of sub-string hash keys for each of a plurality of search strings to generate respective sets of search string hash values for each search string;
  storing the sets of search string hash values in the CAM;
  storing information that maps each CAM entry to a corresponding search string; and
  in response to a match with a CAM entry,
    returning indicia identifying an offset in the packet payload at which a matching sub-string was detected.

6. The method of claim 1, wherein the second analysis stage further comprises:
  sliding a sampling window along that portion of the packet payload, wherein during each iteration a string comprising bytes of data in the sampling window is provided as an input to the at least one TCAM to determine if any sub-strings in the string are present in the search string set S.

7. The method of claim 6, wherein the portion of the packet payload in which the exact match might exist is identified by:
  searching the packet payload from an offset from a beginning of the packet payload at which a first pre-processing stage hit occurred to an endpoint comprising the offset plus the minimum length.

* * * * *

UNITED STATES PATENT AND TRADEMARK OFFICE
CERTIFICATE OF CORRECTION

PATENT NO. : 7,673,041 B2  Page 1 of 1
APPLICATION NO. : 11/264324
DATED : March 2, 2010
INVENTOR(S) : Shankara It is certified that error appears in the above-identified patent and that said Letters Patent is hereby corrected as shown below:

In column 20, at line 53 delete, "5" and insert --S--.

Signed and Sealed this

First Day of June, 2010

David J. Kappos
*Director of the United States Patent and Trademark Office*